US011879570B2

(12) United States Patent
Belen et al.

(10) Patent No.: US 11,879,570 B2
(45) Date of Patent: *Jan. 23, 2024

(54) POSITIVE INSTALLATION INDICATOR ASSEMBLY

(71) Applicant: ASC Engineered Solutions, LLC, Portsmouth, NH (US)

(72) Inventors: Jordan Cameron Belen, West Warwick, RI (US); Matthew William McNamara, Portsmouth, RI (US); Jeffrey Brian Shaffer, Lipan, TX (US); Ronald Pound, Portsmouth, NH (US)

(73) Assignee: ASC Engineered Solutions, LLC, Portsmouth, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/103,532

(22) Filed: Jan. 31, 2023

(65) Prior Publication Data

US 2023/0167927 A1 Jun. 1, 2023

Related U.S. Application Data

(63) Continuation of application No. 17/210,966, filed on Mar. 24, 2021, now Pat. No. 11,592,127.

(60) Provisional application No. 62/994,087, filed on Mar. 24, 2020.

(51) Int. Cl.
*F16L 25/06* (2006.01)
*F16L 15/00* (2006.01)
*F16B 33/02* (2006.01)

(52) U.S. Cl.
CPC ............ *F16L 15/003* (2013.01); *F16B 33/02* (2013.01); *F16L 2201/10* (2013.01)

(58) Field of Classification Search
CPC ......... F16L 25/06; F16L 25/065; F16L 25/08; F16L 21/022; F16L 17/06; F16L 2201/10; F16B 39/36; F16B 39/34; F16B 39/284
See application file for complete search history.

(56) References Cited

U.S. PATENT DOCUMENTS

| 1,584,711 | A | * | 5/1926 | Astrom | F16B 39/36 403/408.1 |
| 2,371,121 | A | | 3/1945 | Basquin | |
| 8,646,813 | B1 | | 2/2014 | Shemtov | |
| 9,401,578 | B2 | * | 7/2016 | Cumant | H01R 43/26 |

(Continued)

OTHER PUBLICATIONS

Belen, Jordan Cameron; Non-Final Office Action for U.S. Appl. No. 17/482,724, filed Sep. 23, 2021, dated Mar. 2, 2023, 21 pgs.

(Continued)

*Primary Examiner* — Aaron M Dunwoody
(74) *Attorney, Agent, or Firm* — Taylor English Duma LLP

(57) ABSTRACT

An indicator assembly includes a fastener defining a first end, a second end opposite the first end, and an axis extending from the first end to the second end; a first indicator positioned radially outwardly of the fastener relative to the axis of the fastener; and a second indicator positioned radially outwardly of the fastener relative to the axis of the fastener, wherein the second indicator is axially in between the first indicator and the second end of the fastener upon the fastener being oriented in a first position, and wherein the second indicator is radially inwardly or radially outwardly of the first indicator upon the fastener being oriented in a second position.

19 Claims, 16 Drawing Sheets

(56) References Cited

U.S. PATENT DOCUMENTS

| | | |
|---|---|---|
| 11,592,127 B2 | 2/2023 | Belen et al. |
| 11,796,095 B2 | 10/2023 | Belen et al. |
| 2015/0030385 A1* | 1/2015 | Bucknell ............... F16L 23/036 403/337 |
| 2021/0301952 A1 | 9/2021 | Belen et al. |
| 2023/0087589 A1 | 3/2023 | Belen et al. |

OTHER PUBLICATIONS

Belen, Jordan Cameron; Non-Final Office Action for U.S. Appl. No. 17/210,966, filed Mar. 24, 2021, dated Jul. 27, 2022, 10 pgs.
Belen, Jordan Cameron; Notice of Allowance for U.S. Appl. No. 17/210,966, filed Mar. 24, 2021, dated Nov. 3, 2022, 5 pgs.
Belen, Jordan Cameron; Notice of Allowance for U.S. Appl. No. 17/482,724, filed Sep. 23, 2021, dated Jun. 16, 2023, 9 pgs.

* cited by examiner

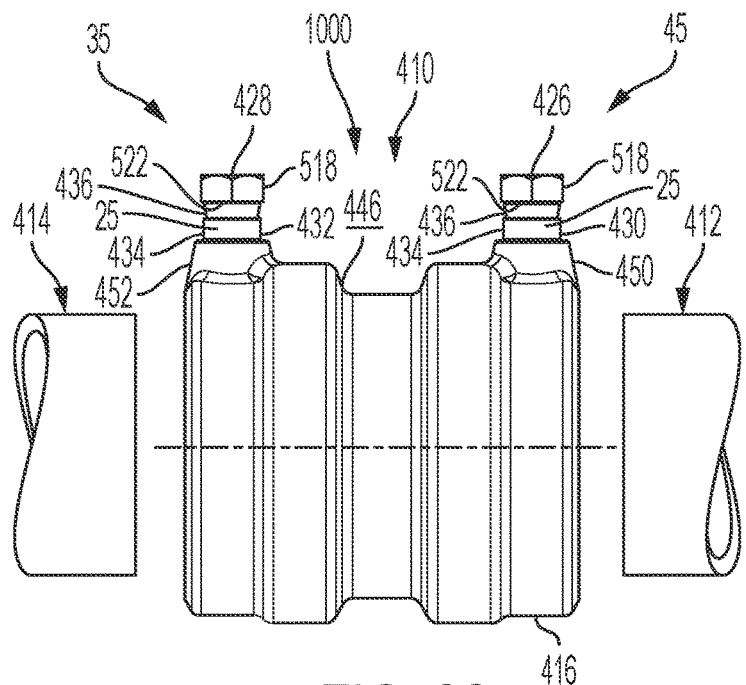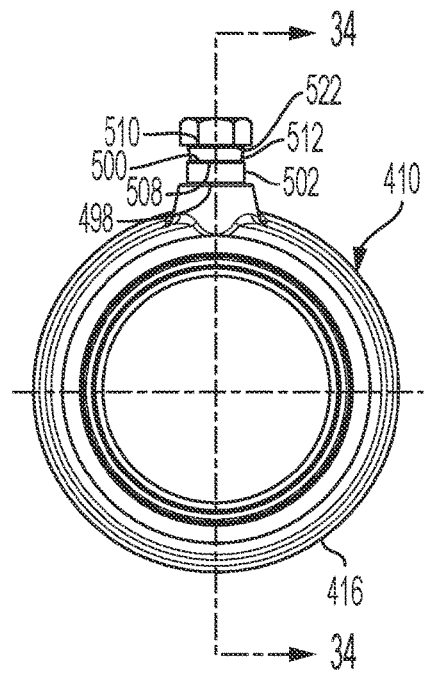
FIG. 32
FIG. 33
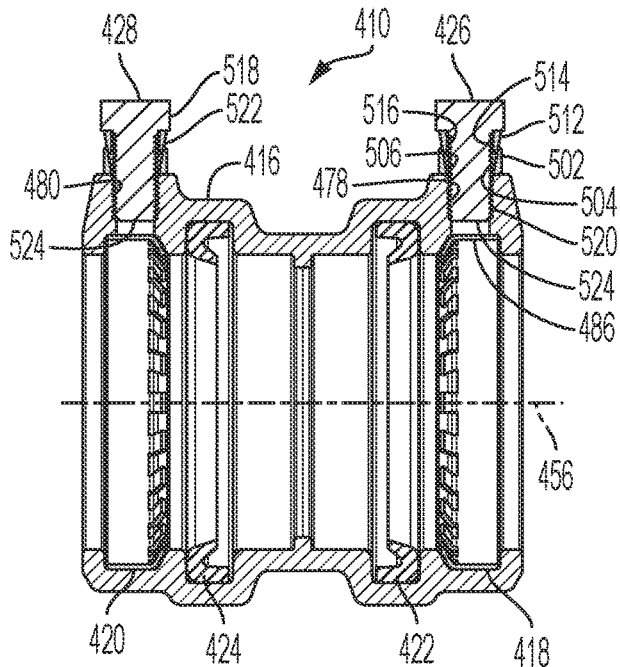
FIG. 34

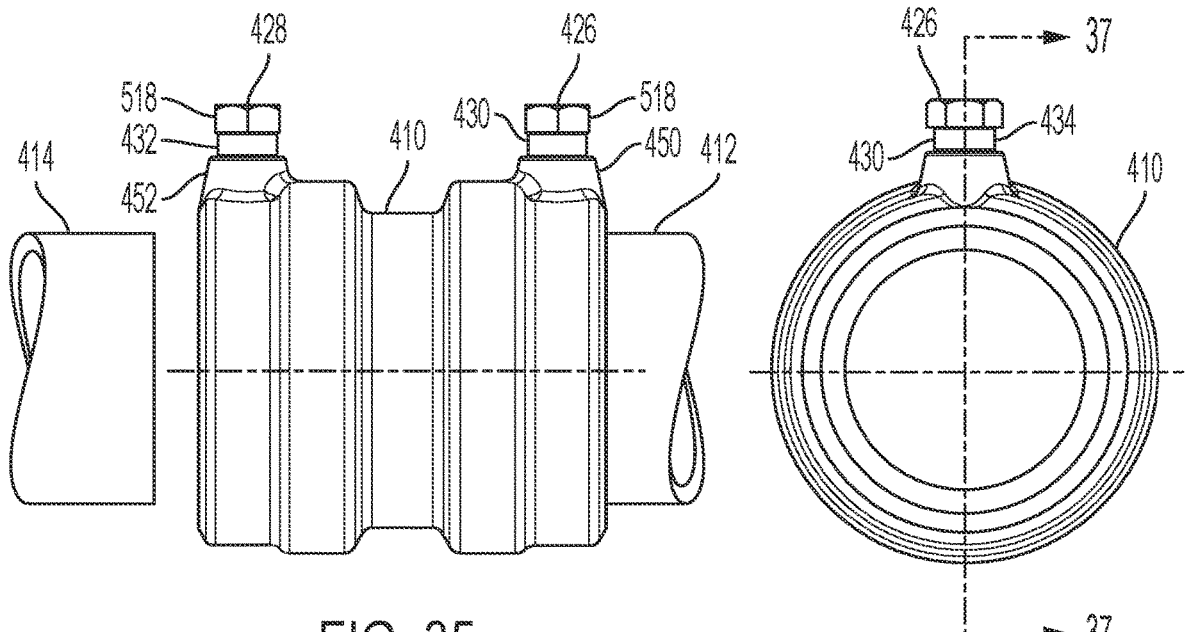
FIG. 35
FIG. 36
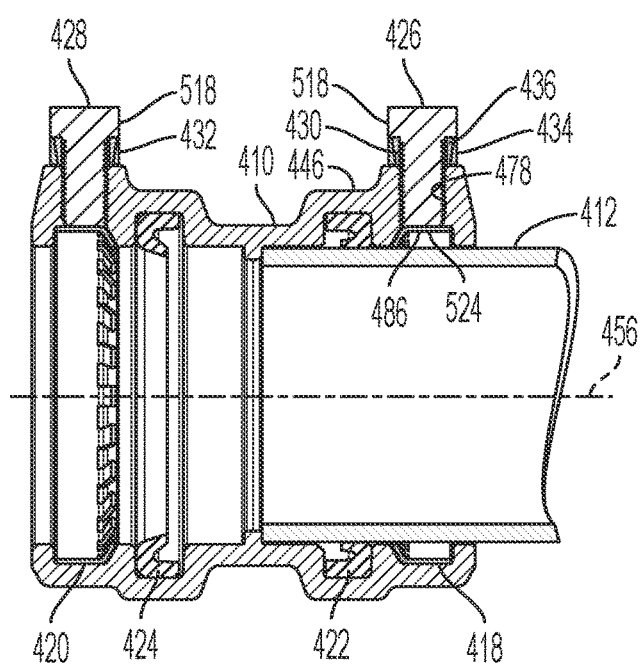
FIG. 37

POSITIVE INSTALLATION INDICATOR ASSEMBLY

CROSS-REFERENCE TO RELATED APPLICATIONS

The present application is a continuation of U.S. application Ser. No. 17/210,966, filed Mar. 24, 2021, which claims the benefit of U.S. Provisional Application No. 62/994,087, filed Mar. 24, 2020, each of which is hereby specifically incorporated by reference herein in its entirety.

TECHNICAL FIELD

This disclosure relates to a pipe fitting for connecting sections of pipes. More specifically, this disclosure relates to a pipe fitting and method for connecting sections of pipes having a positive installation indicator to provide a visual indication that sections of pipes have been properly joined to the pipe fitting.

BACKGROUND

Pipe fittings are commonly used to connect two sections of pipes together to form a pipe connection, such as when installing a pipe system or a pipe infrastructure. Some pipe fittings require tightening one or more set screws inserted into the pipe fitting to secure the sections of pipes to the pipe fittings. The set screws typically should be tightened to a certain depth and/or torque to assure that the clamping force from the set screws provide a reliable seal and/or the pipe section cannot inadvertently separate from the pipe fitting. To assure that the set screws are properly tightened, quality assurance reviews must be made either by measuring the depth of the tightened set screws or by measuring the torque of the set screws using a torque wrench. Such quality assurance reviews are time consuming and prone to human error.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a pipe fitting for joining two pipes comprising a housing, a fastener, a first indicator and a second indicator. The housing has an outer surface, a first end and a second end. The housing defines a cavity extending from the first end to the second end and a hole extending from the outer surface of housing to the cavity. The fastener is situated in the hole. The first indicator is positioned radially outwardly of the fastener. The second indicator is positioned radially outwardly of the fastener. The second indicator is axially in between the first indicator and the outer surface of the housing upon the fastener in a first position and the second indicator is radially inwardly or radially outwardly of the first indicator upon the fastener in a second position.

Also disclosed is a method for joining two pipes, comprising the steps: providing a housing having a housing outer surface, a first housing end, and a second housing end, the housing defining a cavity extending from the first housing end to the second housing end and a hole extending from the housing outer surface to the cavity, the cavity defining an axis, providing a first indicator defining a first indicator bore with the fastener inserted through the first indicator bore, providing a second indicator defining a second indicator bore with the fastener inserted through the second indicator bore and in the hole such that the second indicator is axially in between the first indicator and the housing outer surface, inserting an end of a first pipe into the cavity, and moving the fastener radially inwardly towards the axis of the cavity such that the inner surface of one of the first and second indicator slides along the outer surface of other of the first and second indicator until the one of the first and second indicator is radially outward of the other of the first and second indicator.

Disclosed is an indicator assembly comprising a fastener defining a first end, a second end opposite the first end, and an axis extending from the first end to the second end; a first indicator positioned radially outwardly of the fastener relative to the axis of the fastener; and a second indicator positioned radially outwardly of the fastener relative to the axis of the fastener, wherein the second indicator is axially in between the first indicator and the second end of the fastener upon the fastener being oriented in a first position, and wherein the second indicator is radially inwardly or radially outwardly of the first indicator upon the fastener being oriented in a second position.

A method for joining two pipes is disclosed, the method comprising providing a housing having a housing outer surface, a first housing end, and a second housing end, the housing defining a cavity extending from the first housing end to the second housing end and a hole extending from the housing outer surface to the cavity, the cavity defining an axis; providing a first indicator defining a first indicator bore with a fastener inserted through the first indicator bore; providing a second indicator defining a second indicator bore with the fastener inserted through the second indicator bore and into the hole such that the second indicator is axially in between the first indicator and the housing outer surface; inserting an end of a first pipe into the cavity; and moving the fastener radially inwardly towards the axis of the cavity such that an inner surface of an outer one of the first and second indicator slides along an outer surface of an inner one of the first and second indicator until the outer one of the first and second indicator is radially outward of the inner one of the first and second indicator.

Also disclosed is a pipe fitting for joining two pipes, the pipe fitting comprising a housing having an outer surface, a first end, and a second end, the housing defining a cavity extending from the first end to the second end and a hole extending from the outer surface of housing to the cavity; and an indicator assembly comprising a fastener situated in the hole, a first indicator mounted on the fastener, and a second indicator mounted on the fastener, the fastener defining an axis; wherein the second indicator is axially in between the first indicator and the outer surface of the housing upon the fastener being oriented in a first position, and wherein the second indicator is radially inwardly or radially outwardly of the first indicator upon the fastener being oriented in a second position.

Additionally, disclosed is a pipe coupling comprising a coupling body defining a hole; and an indicator assembly comprising a fastener extending through the hole, a first indicator mounted on the fastener, and a second indicator mounted on the fastener, the fastener defining an axis; wherein the second indicator is axially in between the first indicator and the coupling body upon the fastener being oriented in a first position, and wherein the second indicator is radially inwardly or radially outwardly of the first indicator upon the fastener being oriented in a second position.

Further, disclosed is an indicator assembly comprising a first indicator ring defining a first end, a second end opposite the first end, an outer surface, and an inner surface opposite the outer surface, the inner surface defining a conical, hollow bore extending from the first end to the second end, wherein a diameter of the conical, hollow bore at the first end is less than a diameter of the conical, hollow bore at the second end; and a second indicator ring configured to engage the conical, hollow bore of the first indicator ring, the second indicator ring defining a first end, a second end opposite the first end, an outer surface, and an inner surface opposite the outer surface, the outer surface defining a conical shape, wherein a diameter of the outer surface at the first end is less than a diameter of the outer surface at the second end.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 32 is a side view of the pipe fitting according to a third aspect of the present disclosure prior to sections of pipes inserted into the pipe fitting and the set screws tightened.

FIG. 33 is a front view of the pipe fitting of FIG. 32.

FIG. 34 is cross-sectional view of the pipe fitting along line 34-34 as shown in FIG. 33.

FIG. 35 is a side view of the pipe fitting illustrated in FIG. 33 after one section of pipe has been inserted into the pipe fitting and the set screws tightened.

FIG. 36 is a front view of the pipe fitting of FIG. 35.

FIG. 37 is cross-sectional view of the pipe fitting along line 37-37 as shown in FIG. 36.

DETAILED DESCRIPTION

Figure 1:
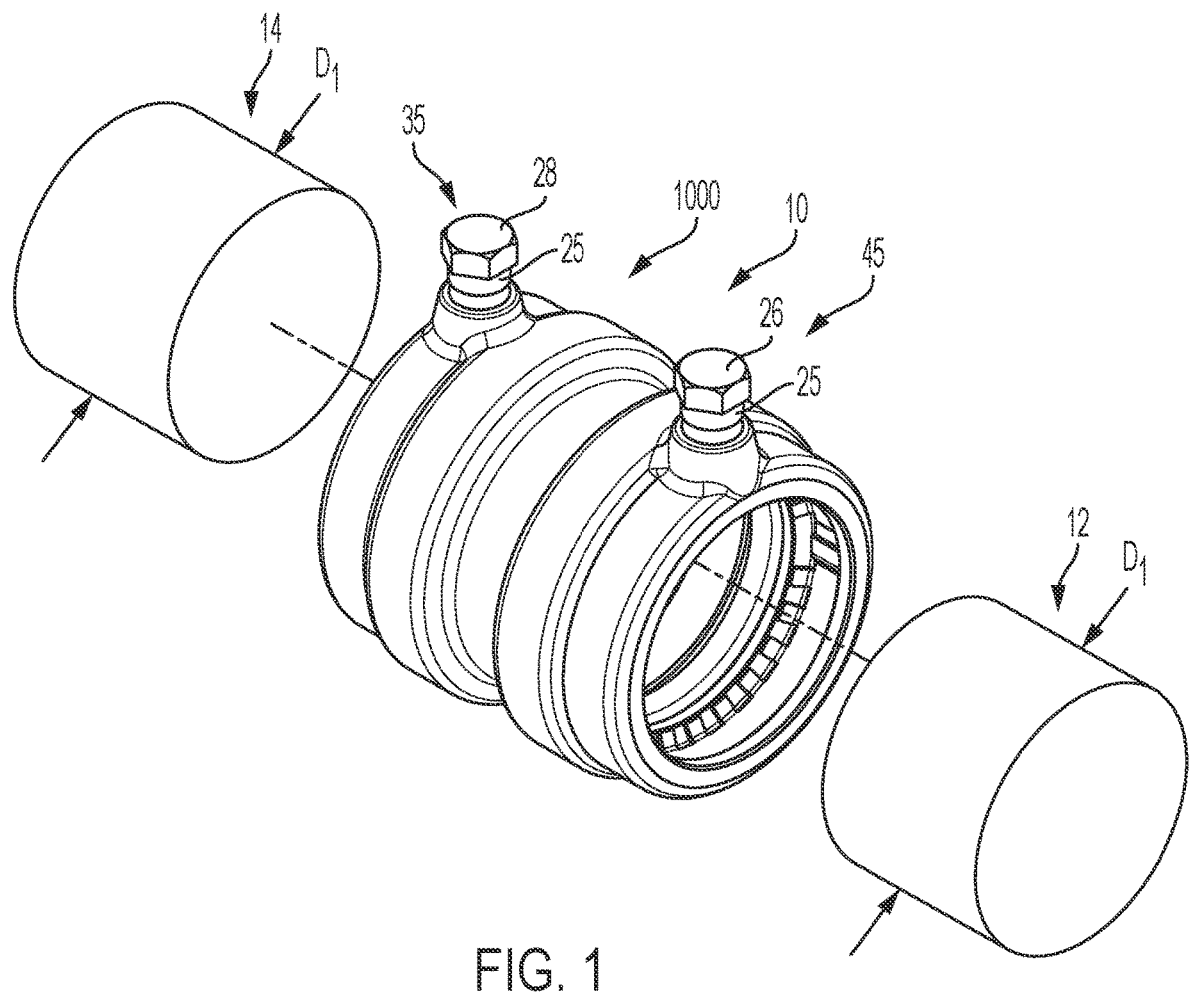
FIG. 1 is a perspective view of a pipe fitting prior to sections of pipes inserted into the pipe fitting and the set screws tightened.
Figure 2:
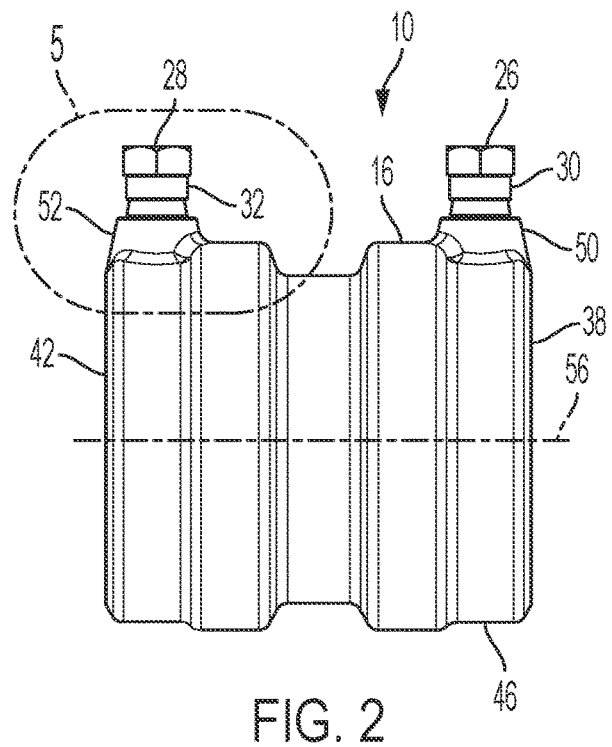
FIG. 2 is a side view of the pipe fitting illustrated in FIG. 1.
Figure 3:
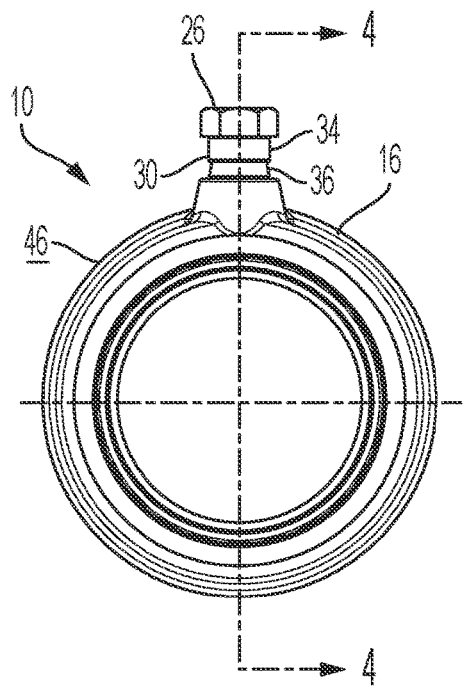
FIG. 3 is a front view of the pipe fitting of FIG. 2.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about W, L, D, H, θ or substantially W, L, D, H, θ on a particular measurement scale measures within a range between W, L, D, H, θ plus an industry-standard upper tolerance for the specified measurement and W, L, D, H, θ minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a pipe fitting for connecting sections of pipes and associated methods, systems, devices, and various apparatus. It would be understood by one of skill in the art that the disclosed strike assembly is described in but a few exemplary aspects among many. No particular terminology or description should be considered limiting on the disclosure or the scope of any claims issuing therefrom.

A first aspect of a fitting assembly 1000 comprising pipe fitting 10 is disclosed and described in FIGS. 1-25. The pipe fitting 10 can be any suitable type of fitting, including but not limited to, a coupler, adapter, tee, elbow, flange, pipe coupling, pipe clamp, and the like. As shown in FIG. 1, the pipe fitting 10 can be a coupler fitting 15 for connecting a first pipe section 12 to a second pipe section 14. As shown in FIGS. 1-5, the pipe fitting 10 can comprise a housing 16, a first grip ring 18, a second grip ring 20, a first annular seal 22, a second annular seal 24, a first set screw 26, a second set screw 28, and one or more positive installation indicators 25. In the present aspect, the one or more positive installation indicators 25 can comprise a first positive installation indicator 30, and a second positive installation indicator 32. The first set screw 26 and the first positive installation indicator 30 can define a first indicator assembly 35, and the second set screw 28 and the second positive installation indicator 32 can define a second indicator assembly 45. Each positive installation indicator 30,32 includes an outer indicator ring 34 and an inner indicator ring 36. Furthermore, each of the first and second set screws 26,28 can define a first end 27 and a second end opposite the first end 29. It should be noted that any other suitable fasteners, including but not limited to bolts, screws and rivets, may be used in place of the set screws 26,28. FIGS. 1-5 illustrate the pipe fitting 10 prior to the pipe sections 12,14 inserted into the pipe fitting 10 and prior to the set screws 26,28 tightened to secure the pipe sections 12,14 to the pipe fitting 10. In other aspects, the positive installation indicator(s) 25 can be used with any suitable fastener(s), such as bolts, on any other suitable type of fitting, such as a pipe clamp or pipe coupling, wherein it is desired to indicate that the fastener(s) are properly tightened.

The housing 16 illustrated in FIG. 6-9 can be formed of a high strength metallic material, including but not limited to iron, steel, aluminum, or their alloys or of a high strength polymeric material. The housing 16 can be formed by casting, stamping and/or machining. The housing 16 has a first end 38 defining a first entrance 40 and a second end 42 defining a second entrance 44. The housing 16 has a generally annular outer surface 46 and a generally annular inner surface 48. The outer surface 46 of the housing 16 includes a first boss 50, a second boss 52 and an annular groove 54.

The housing 16 defines an axis 56 extending from the first end 38 of the housing to the second end 42 of the housing. The inner surface 48 of the housing defines a cavity 58 radially inwardly of the inner surface 48 and extending from the first entrance 40 to the second entrance 44. The axis 56 extends through the middle center line of the cavity 58. The inner surface 48 defines a first grip ring retaining groove 60 axially inwardly of the first entrance 40 and a second grip ring retaining groove 62 axially inwardly of the second entrance 44. Axially inwardly of the first grip ring retaining groove 60 is a first annular seal retaining groove 64 and axially inwardly of the second grip ring retaining groove 62 is a second annular seal retaining groove 66. A first pipe retaining portion 68 is located axially inwardly of the first annular seal retaining groove 64 and a second pipe retaining portion 70 is located axially inwardly of the second annular seal retaining groove 66. A diameter $D_2$ of the pipe retaining portions 68,70 is slightly larger than a diameter $D_1$ of the first and second pipe sections 12,14 (shown in FIG. 1) to allow the pipe sections 12,14 to be inserted into the pipe retaining portions 68,70 while minimizing radial movement of the pipe sections 12,14 relative to the housing 16. An annular radially inwardly extending pipe abutment 72 is located between the first pipe retaining portion 68 and the second pipe retaining portion 70. The pipe abutment 72 has a first annular surface 74 to prevent the first pipe section 12 from moving further axially inwardly and a second annular surface 76 to prevent the second pipe section 14 from moving further axially inwardly. The first grip ring retaining groove 60, the first annular seal retaining groove 64, the first pipe retaining portion 68, the pipe abutment 72, the second pipe retaining portion 70, the second annular seal retaining groove 66 and the second grip retaining groove 62 to together form the inner surface 48 of the housing 16.

The housing 16 defines a first threaded hole 78 extending through the first boss 50 radially inwardly towards the housing axis 56 from the outer surface 46 to the inner surface 48 of the housing. The first threaded hole 78 can be sized to accommodate the first set screw 26 (shown in FIGS. 1-5). The housing 16 further defines a second threaded hole 80 extending through the second boss 52 radially inwardly towards the housing axis 56 from the outer surface 46 to the inner surface 48 of the housing. The second threaded hole 80 can be sized to accommodate the second set screw 28 (shown in FIGS. 1-5). The threaded holes 78,80 can be chamfered to allow the set screws 26,38, to be guided to the holes 78,80. The first threaded hole 78 defines an axis 82. The axis 82 of the first threaded hole 78 is approximately perpendicular to the axis 56 of the housing 16. The second threaded hole 80 defines an axis 84. The axis 84 of the second threaded hole 80 is approximately perpendicular to the axis 56 of the housing 16.

The grip ring 18,20 of the pipe fitting 10 is illustrated in FIGS. 10-14. The grip rings 18,20 of the illustrated aspect are identical in size and shape. In other aspects, the grips rings 18,20 can have different sizes and/or shapes to accommodate for different sizes and/or shapes of the pipe sections. For instance, the pipe fitting 10 may be for joining the first pipe section 12 to the second pipe section 14 wherein the diameter of the first pipe section 12 is greater than the diameter of the second pipe section 14. For such a pipe fitting 10 for joining a first pipe section 12 to a smaller diameter second pipe section 14, the diameter of the first entrance 40 of the housing 16 should be larger than the diameter of the second entrance 44, and the size of the first grip ring 18 should also be larger than the diameter of the second grip ring 20. The illustrated grip ring 18,20 can be formed of a metal material, including but not limited to, steel, aluminum or their alloys. The grip ring 18,20 can formed by stamping a blank sheet of metallic material and then bending the stamped material into the shape of a ring and connecting and/or contacting at the ends. Alternatively, a polymeric material can used to form the grip ring 18,20. A mold can be used to form the polymeric grip ring 18,20.

Each grip ring 18,20 includes a ring body 86 and a plurality of teeth 88 extending axially outwardly and radially inwardly from one axial end of the ring body 86. Each grip ring 18,20 is positioned in the corresponding grip ring retaining groove 60,62 such that the teeth 88 extend axially away from the corresponding entrance 40,44 (shown in FIG. 4). The teeth 88 can be flexible to allow the teeth 88 to flex radially outwardly while being able to apply a radially inwardly force upon the teeth 88 flexed radially outwardly. The teeth 88 are illustrated as being generally rectangular shaped. The teeth can also be formed of other shapes, such as a triangle shape. Each tooth has a terminal end 90. A diameter $D_3$ of the terminal ends 90 of the teeth is smaller than the diameter $D_1$ of the first and second pipe sections 12,14 (shown in FIG. 1), such that as the pipe section 12,14 is inserted through the corresponding grip ring 18,20, the outer surface of the pipe section 12,14 pushes or flexes the teeth 88 radially outwardly. Since the teeth 88 extend away from the corresponding entrance 40,44, once the teeth 88 are radially outwardly of the pipe section 12,14, the terminal ends 90 of the teeth 88 will dig into the outer surface of the pipe section 12,14 should a pulling force be exerted axially to the pipe section in a direction that would separate the pipe section from the pipe fitting.

Figure 4:
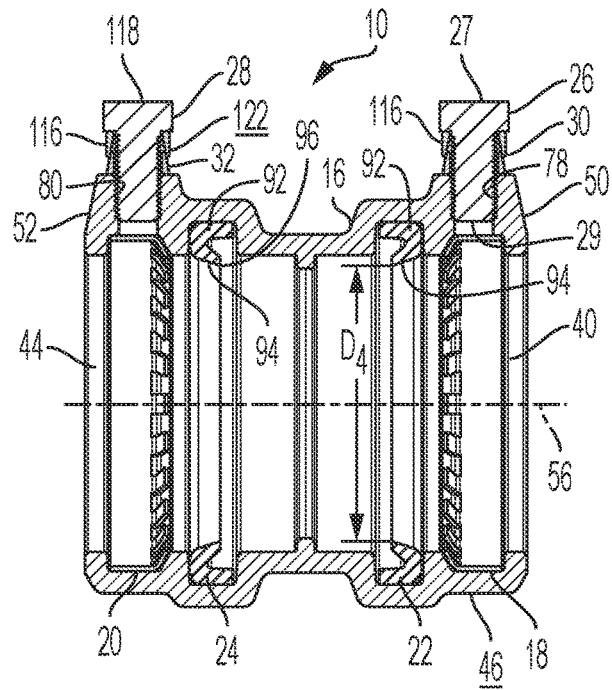
FIG. 4 is cross-sectional view of the pipe fitting along line 4-4 as shown in FIG. 3.
Figure 5:
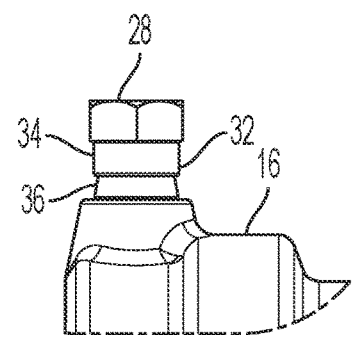
FIG. 5 is an enlarged view of portion 5 circled in FIG. 2.
Figure 6:
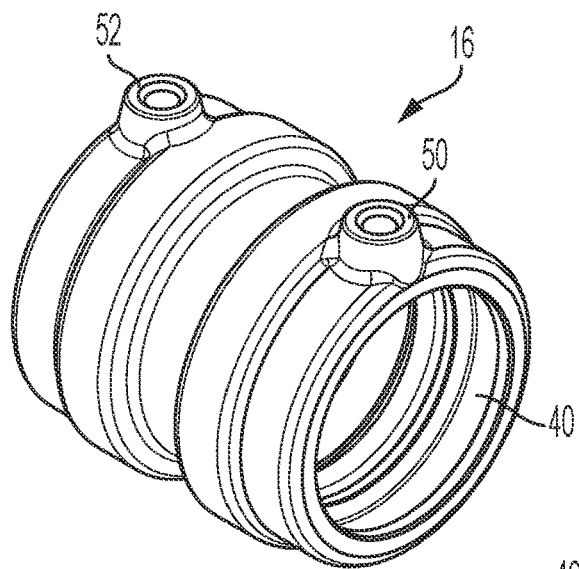
FIG. 6 is a perspective view of the housing illustrated in FIG. 1.
Figure 7:
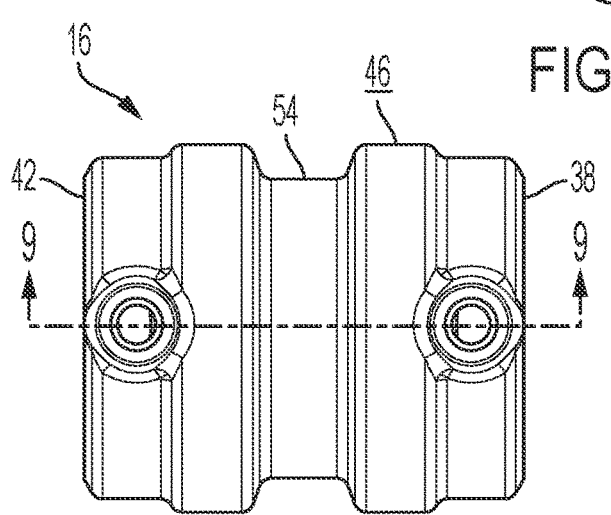
FIG. 7 is a top view of the housing of FIG. 6.
Figure 8:
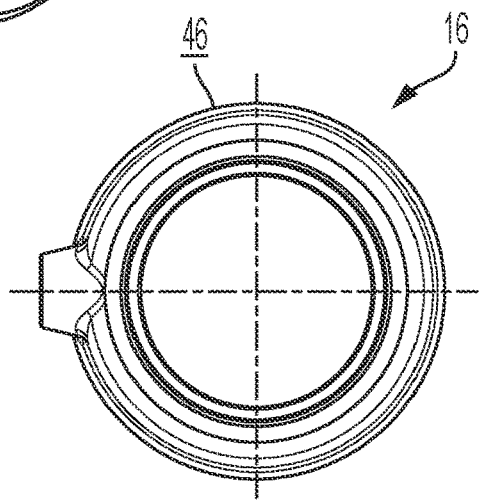
FIG. 8 is a front view of the housing of FIG. 6.
Figure 9:
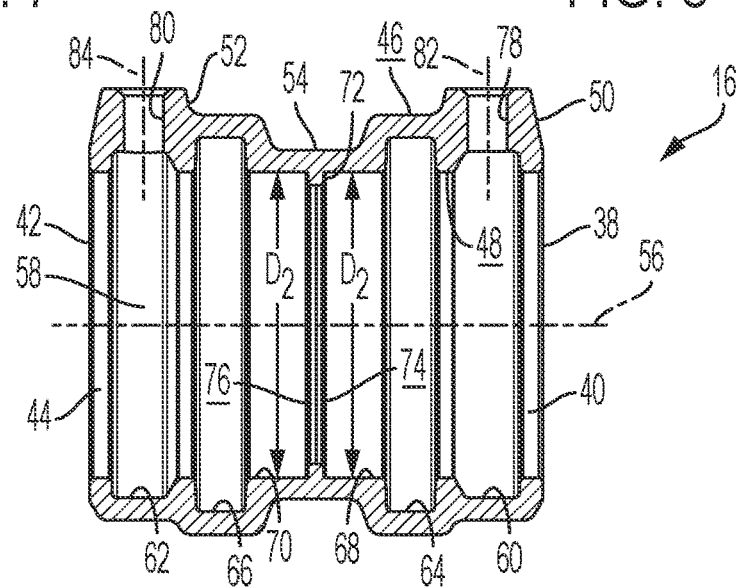
FIG. 9 is a cross-sectional view of the housing along line 9-9 as shown in FIG. 8.
Figure 10:
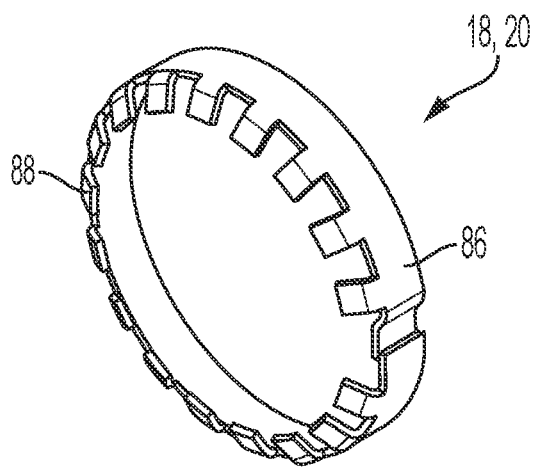
FIG. 10 is a perspective view of the grip ring illustrated in FIG. 1.
Figure 11:
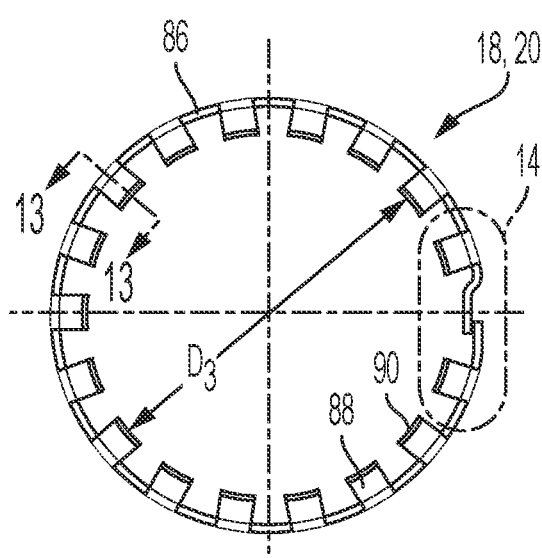
FIG. 11 is a back view of the grip ring of FIG. 10.
Figure 12:
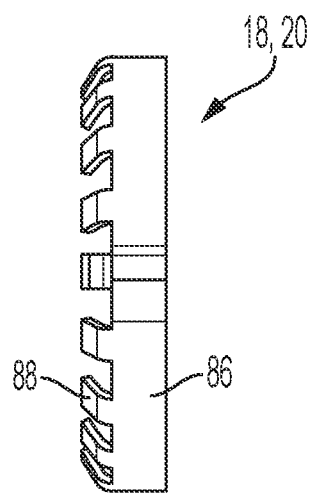
FIG. 12 is a side view of the grip ring of FIG. 10.
Figure 13:
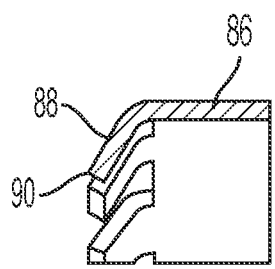
FIG. 13 is a cross-sectional view of the grip ring along line 13-13 as shown in FIG. 11.
Figure 14:
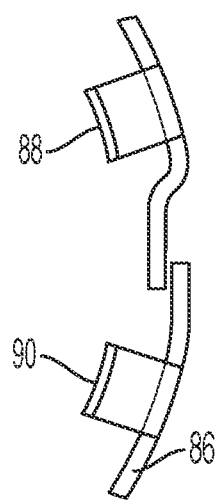
FIG. 14 is an enlarged view of portion 14 illustrated in FIG. 11.

The annular seals 22,24 of the pipe fitting 10 is illustrated in FIG. 4. The annular seals 22,24 of the illustrated aspect are identical in size and shape. In other aspects, the annular seals 22,24 can have different sizes and/or shapes to accommodate for different sizes and/or shapes of the pipe sections 12,14. For instance, the pipe fitting 10 may be for joining the first pipe section 12 to the second pipe section 14 wherein the diameter of the first pipe section 12 is greater than the diameter of the second pipe section 14. For such a pipe fitting 10 for joining the first pipe section 12 to a smaller diameter second pipe section 14, the size of the first annular seal 22 will need to be larger than the diameter of the second annular seal 24. The illustrated annular seals 22,24 can be formed of an elastic material, including but not limited to, rubber or plastic. The annular seal 22,24 can formed by molding or casting in a die.

Each annular seal 22,24 includes a ring body 92 and a lip or sealing portion 94 extending axially inwardly and radially inwardly from one axial end of the ring body 92. Each annular seal 22,24 is positioned in the corresponding annular seal retaining groove 64,66 such that the sealing portion 94 extend axially away from the corresponding entrance 40,44 (shown in FIG. 4). The lip or sealing portion 94 has a radially inward annular edge 96. A diameter $D_4$ of the radially inward annular edge 96 of the sealing portion (shown in FIG. 4) is smaller than the diameter $D_1$ of the first and second pipe sections 12,14 (shown in FIG. 1), such that as the pipe section 12,14 is inserted through the annular seal 22,24, the outer surface of the pipe section 12,14 stretches the sealing portion 94 radially outwardly. Since the sealing portion 94 extends away from the corresponding entrance 40,44, the pipe section 12,14 is able to slide along with sealing portion 94 without kinking the sealing portion. This allows a tight seal to be formed between the pipe section 12,14 and the corresponding annular seal 22,24.

Figure 15:
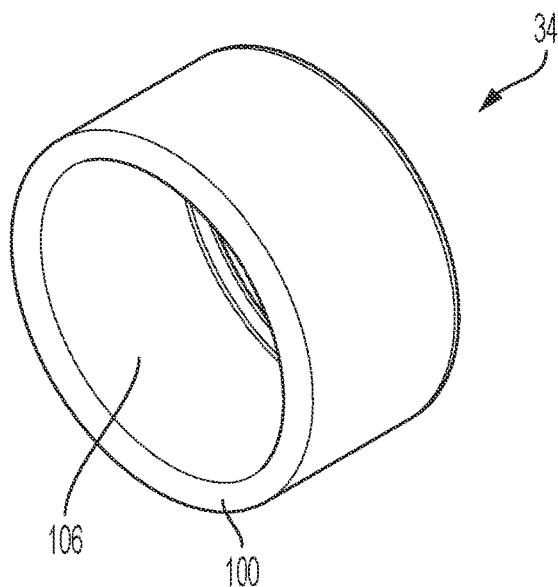
FIG. 15 is a perspective bottom view of an outer indicator ring.
Figure 16:
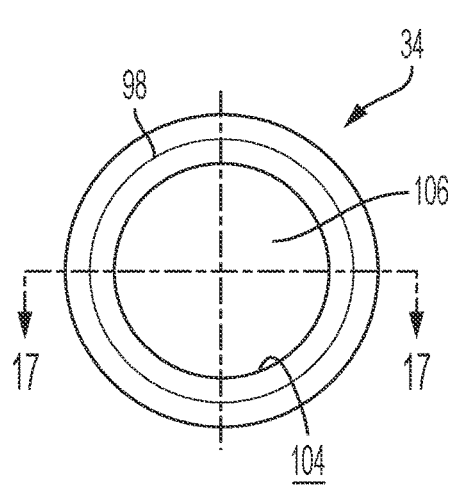
FIG. 16 is a top view of the outer indicator ring of FIG. 14.
Figure 17:
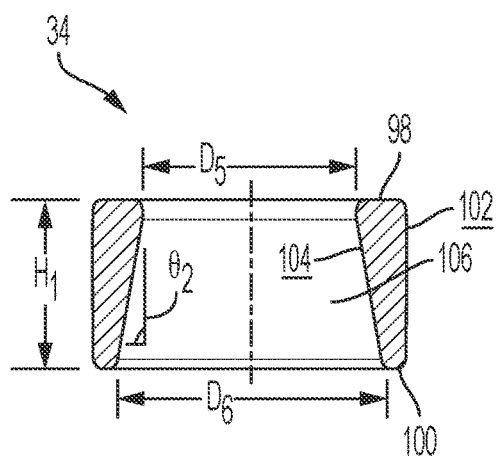
FIG. 17 is a cross-sectional view of the outer indicator ring along line 17-17 as shown in FIG. 16.
Figure 18:
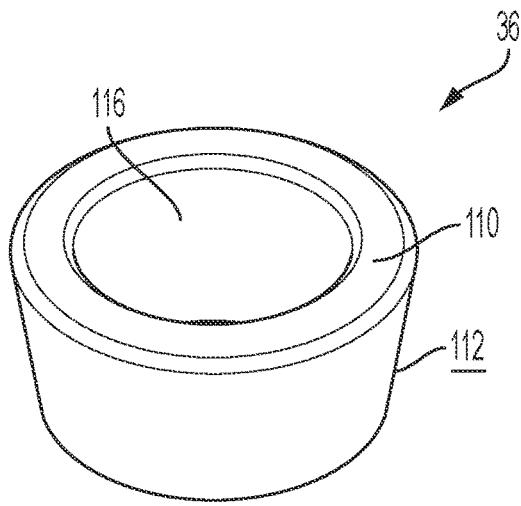
FIG. 18 is a perspective bottom view of an inner indicator ring.
Figure 19:
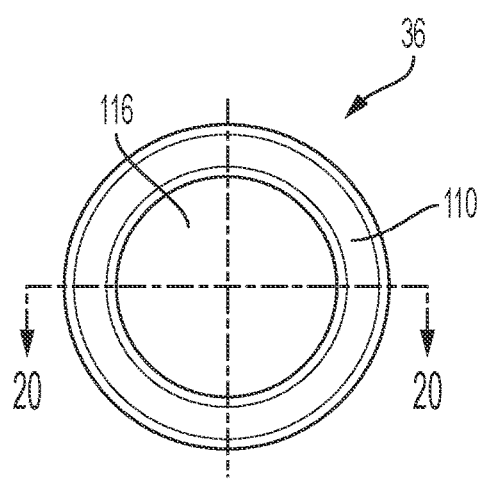
FIG. 19 is a bottom view of the inner indicator ring of FIG. 18.
Figure 20:
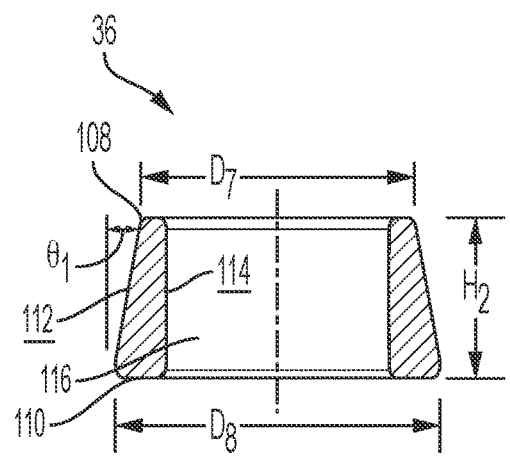
FIG. 20 is a cross-sectional view of the inner indictor ring along line 20-20 as shown in FIG. 19.
Figure 21:
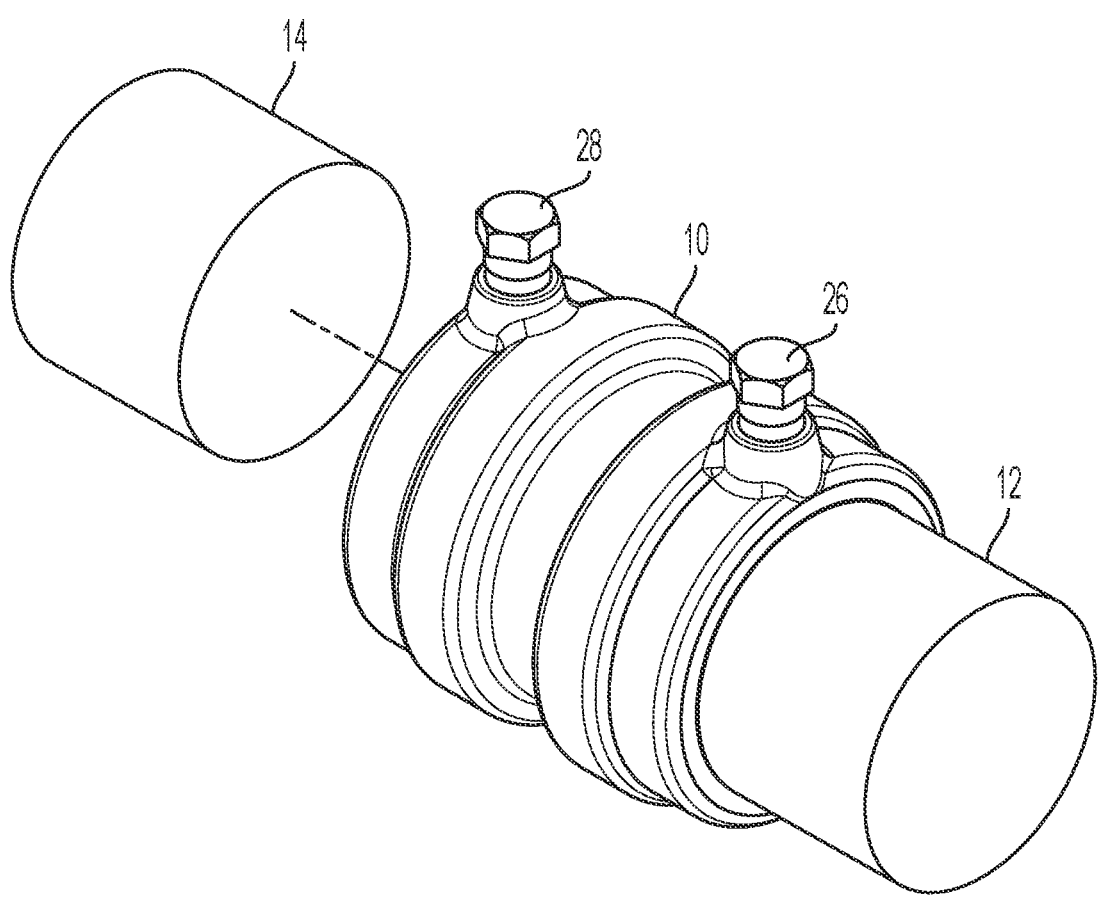
FIG. 21 is a perspective view of the pipe fitting illustrated in FIG. 1 after one section of pipe has been inserted into the pipe fitting and the set screws tightened.
Figure 22:
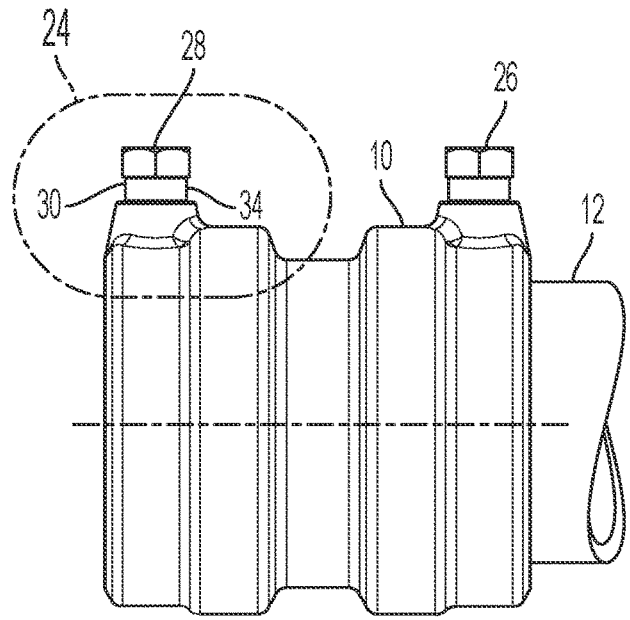
FIG. 22 is a side view of the pipe fitting of FIG. 21.
Figure 23:
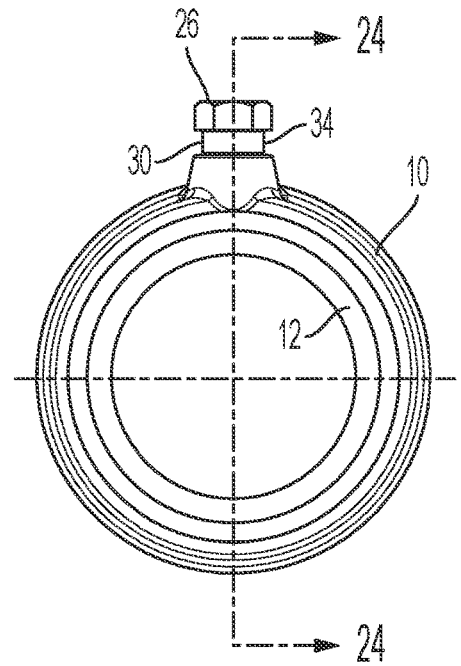
FIG. 23 is a front view of the pipe fitting of FIG. 21.
Figure 24:
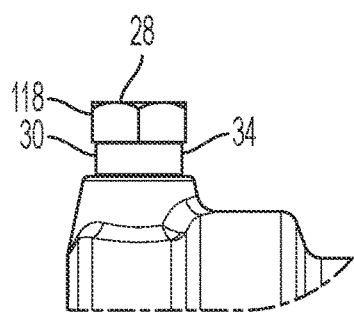
FIG. 24 is an enlarged view of portion 24 circled in FIG. 22.
Figure 25:
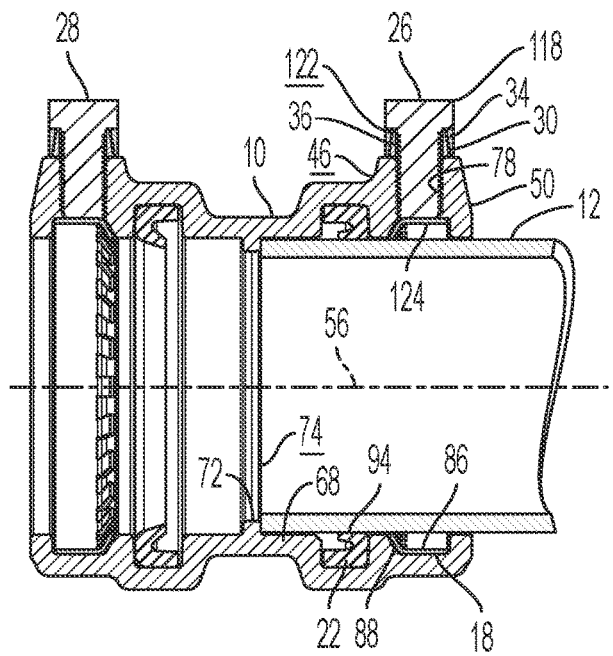
FIG. 25 is cross-sectional view of the pipe fitting along line 25-25 as shown in FIG. 23.

The outer indicator ring 34 is illustrated in FIGS. 15-17 and the inner indicator ring 36 is illustrated in FIGS. 18-20. The outer indictor ring 34 and the inner indicator 36 together form a positive installation indicator 30,32 (shown in FIGS. 1-5). The inner indicator ring 36 can be of a color different than the color of the outer indicator ring 34. For example, the inner indicator ring 36 can be red while the outer indicator ring 34 can be green. The outer indicator ring 34 can be formed of a polymeric material or a rubber material. The outer indicator ring 34 includes a first end 98, a second end 100, an outer surface 102 and an inner surface 104. The outer indicator ring 34 defines a hollow bore 106 extending from the first end 98 to the second end 100. The inner surface 104 of the outer indicator ring 34 is conical shaped such that a diameter $D_5$ of the inner surface 104 at first end 98 is smaller than a diameter $D_6$ of the inner surface 104 at the second end 100. The inner indicator ring 36 can be formed of a polymeric material. In some aspects, the inner indicator ring 36 can define a hardness that can be different from a harness of the outer indicator ring 34. Furthermore, in some aspects, the inner indicator ring 36 can define an elasticity than can be different from an elasticity of the outer indicator ring 34. For example, the inner indicator ring 36 can be formed of a material that is harder or less elastic than the material forming the outer indicator ring 34 such that upon the outer indicator ring 34 being slid over the inner indicator ring 36, the outer indicator ring 34 is able to expand radially outwardly to accommodate the inner indicator ring 36 being further inserted into the outer indicator ring 34. The inner indicator ring 36 includes a first end 108, a second end 110, an outer surface 112 and an inner surface 114. The inner indicator ring 36 defines a hollow bore 116 extending from the first end 108 to the second end 110. The outer surface 112 of the inner indicator ring 36 is conical shaped such that a diameter $D_7$ of the outer surface 112 at the first end 108 is smaller than a diameter $D_8$ of the outer surface 112 at the second end 110. An angle $\theta_1$ of the outer surface of the inner indicator ring 36 is approximately the same as an angle $\theta_2$ of the inner surface of the outer indicator ring 34 to allow the outer indicator ring 34 to be situated radially outwardly of the inner indicator ring 36 upon the outer indicator ring 34 being expanded. The height $H_1$ of the outer indicator ring 34 can be larger than the height $H_2$ of the inner indicator ring 36. By having the outer indicator ring 34 taller than the inner indicator ring 36, the outer indicator ring 34 is able to completely cover the inner indicator ring 36. That is, the entire inner indicator ring 36 can be radially inward of the outer indicator ring 34, and the entire outer indicator ring 36 can be radially outward of inner indicator ring 36.

The first and second set screws 26,28, each includes a head 118 and a threaded shaft 120 (shown in FIG. 4). The head 118 of each set screw 26,28 has an annular axial inner surface 122 adjacent and transitions to the threaded shaft 120. The first set screw 26 is inserted through the hollow bore 106 of the outer indicator ring 34 (shown in FIG. 17) such that the first end 98 of the outer indicator ring is adjacent to and abuts the axial inner surface 122 of the head 118. The first set screw 26 is then inserted through the hollow bore 116 of the inner indicator ring 36 (shown in FIG. 20) such that the first end 108 of the inner indicator ring is adjacent to the second end 100 of the outer indicator ring 34. The first set screw 26, with the outer indicator ring 34 and the inner indicator ring 36 positioned radially outwardly of the shaft 120, is attached to the housing 16 by inserting the threaded shaft 120 in the first threaded hole 78 and rotating the first set screw 26 to move the first set screw radially inwardly along the axis 82 of the first threaded hole 78 (shown in FIG. 9) towards the housing axis 56. Likewise, the second set screw 28 is inserted through the hollow bore 106 of the outer indicator ring 34 such that the first end 98 of the outer indicator ring is adjacent to and abuts the axial inner surface 122 of the head 118. The second set screw 28 is then inserted through the hollow bore 116 of the inner indicator ring 36 such that the first end 108 of the inner indicator ring is adjacent to the second end 100 of the outer indicator ring 34. The first set screw 26, with the outer indicator ring 34 and the inner indicator ring 36 positioned radially outwardly of the shaft 120 is attached to the housing 16 by inserting the threaded shaft 120 in the second threaded hole 80 and rotating the second set screw 28 to move the second set screw radially inwardly along the axis 84 of the second thread hole towards the housing axis 56.

Referring to FIGS. 21-25, after the first grip ring 18 has been installed in the first grip ring retaining groove 60, the second grip ring 20 has been installed in the second grip ring retaining groove 62, the first annular seal 22 has been installed in the first annular seal retaining groove 64, the second annular seal 24 has been installed in the second annular seal retaining groove 66, the first set screw 26, with the first positive installation indicator 30 positioned radially outwardly of the shaft 120, has been installed in the first threaded hole 78, and the second set screw 28, with the second positive installation indicator 32 positioned radially outwardly of the shaft 120, has been installed in the second threaded hole 80, the first pipe section 12 and the second pipe section 14 can be joined to the pipe fitting 10.

FIGS. 21-25 illustrate only the first pipe section 12 inserted into and joined to the pipe fitting 10. The second pipe section 14 is not shown in FIGS. 22-25 to provide clarity and contrast to a pipe section that has been inserted into and joined to the pipe fitting 10. It should be noted that to join the first pipe section 12 and the second pipe section 14 to the pipe fitting 10 to form a fluid connection between the first pipe section 12 with the second pipe section 14, the second pipe section 14 is inserted into and secured to the pipe fitting 10 in the same manner that the first pipe section 12 is inserted into and secured to the pipe fitting 10.

To join the first pipe section 12 to the pipe fitting 10, the first pipe section 12 is inserted axially into the pipe fitting 10 through the first entrance 40 (shown in FIG. 4). As the first pipe section 12 is inserted further into the pipe fitting 10, the outer surface of the first pipe section 12 pushes and flexes the teeth 88 of the first grip ring 18 radially outwardly. Further insertion of the first pipe section 12 into the pipe fitting 10 causes the outer surface of the first pipe section 12 to contact the sealing portion 94 of the first annular seal 22 and stretch the sealing portion 94 radially outwardly to create a fluid seal between the first pipe section 14 and the first annular seal 22. The first pipe section 14 is inserted into the pipe fitting 10 until the end of the first pipe section 14 abuts first annular surface 74 of the pipe abutment 72 and is situated in the first pipe retaining portion 68. Once the first pipe section 12 has been properly inserted into the pipe fitting 10, the first pipe section 12 can be secured to the pipe fitting 10. To secure the first pipe section 12 to the pipe fitting 10, the first set screw 26 is rotated such that the threading of the first set screw 26 and the threading of the first threaded hole 78 causes the first set screw 26 to move radially inwardly towards the housing axis 56. As the first set screw 26 moves radially inwardly, the outer indicator ring 34 and the inner indicator ring 36 are compressed in between the axially inner surface 122 of the head 118 of the set screw 26 and the outer surface 46 of the housing 16 at the first boss 50. As the outer indicator ring 34 and the inner indicator ring 36 are being compressed, the outer indicator ring 34 expands and slides over the inner indicator ring 36. The first set screw 26 is moved radially inwardly until an end 124 of the first set screw 26 pushes against the ring body 86 of the first grip ring 18 to apply a clamping force to the first pipe section 12; thus, preventing the first pipe section 12 from moving axially relative to the pipe fitting 10. The first positive installation indicator 30 is sized or calibrated such that upon the first set screw 26 being moved to a position where the end 124 of the first set screw 26 pushes the ring body 86 to apply the necessary clamping force to the first pipe section, the inner indicator ring 36 is completely radially inwardly of the outer indicator ring 34 such that the inner indicator ring 36 is no longer visible. The inner indicator ring 36 can be of a color different than the color of the outer indicator ring 34. For example, the inner indicator ring 36 can be red while the outer indicator ring 34 can be green. Having the inner indicator ring 36 be a different color than the outer indicator ring 34 allows for easy visual verification that the outer indicator ring 34 has completely surrounded the inner indicator ring 34 and the first set screw 26 has moved sufficiently radially inwardly to push the ring body 86 to apply the necessary clamping force to the first pipe section 12.

While FIGS. 21-25 do not illustrate the second pipe section 14 inserted into and joined to the pipe fitting 10, the process for inserting the second pipe section 14 into the pipe fitting 10 through the second entrance until the end of the second pipe section 14 abuts the second annular surface 76 of the pipe abutment 72 and is situated in the second pipe retaining portion 70 is the same as the process for inserting the first pipe section 12 into the pipe fitting 10 through the first entrance until the end of the first pipe section 12 abuts the first annular surface 74 of the pipe abutment and is situated in the first pipe retaining portion 68. Likewise, while FIGS. 21-25 do not illustrate the second pipe section 14 secured to the pipe fitting 10, the process for securing the second pipe section 14 to the pipe fitting 10 is the same as the process for securing the first pipe section 14 to the pipe fitting 10. The second set screw 28 is rotated such that the threading of the second set screw 28 and the threading of the second threaded hole 80 causes the second set screw 28 to move radially inwardly towards the housing axis 56. As the second set screw 28 moves radially inwardly, the outer indicator ring 34 and the inner indicator ring 36 are compressed in between the axially inner surface 122 of the head 118 of the set screw 28 and the outer surface 46 of the housing 16 at the second boss 52. As the outer indicator ring 34 and the inner indicator ring 36 are being compressed, the outer indicator ring 34 expands and slides over the inner indicator ring 36. The second set screw 28 is moved radially inwardly until the end 124 of the second set screw 28 pushes against the ring body 86 of the second grip ring 20 to apply a clamping force to the second pipe section 14; thus, preventing the second pipe section 14 from moving axially relative to the pipe fitting 10. The second positive installation indicator 32 is sized or calibrated such that upon the second set screw 28 being moved to a position where the end 124 of the second set screw 28 pushes the ring body 86 to apply the necessary clamping force to the second pipe section, the inner indicator ring 36 is completely radially inwardly of the outer indicator ring 34 such that the inner indicator ring 36 is no longer visible. The inner indicator ring 36 can be of a color different than the color of the outer indicator ring 34. For example, the inner indicator ring 36 can be red while the outer indicator ring 34 can be green. Having the inner indicator ring 36 be a different color than the outer indicator ring 34 allows for easy visual verification that the outer indicator ring 34 has completely surrounded the inner indicator ring 34 and the second set screw 28 has moved sufficiently radially inwardly to push the ring body 86 to apply the necessary clamping force to the second pipe section 14.

Figure 26:
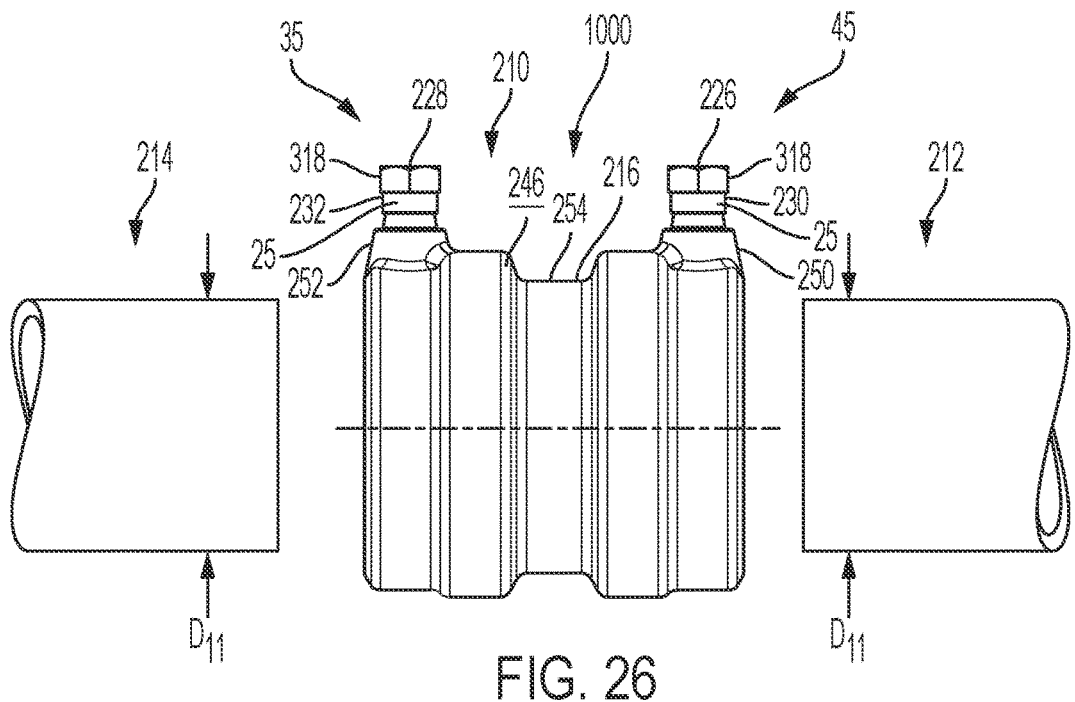
FIG. 26 is a side view of the pipe fitting according to a second aspect of the present disclosure prior to sections of pipes inserted into the pipe fitting and the set screws tightened.
Figures 27, 28:
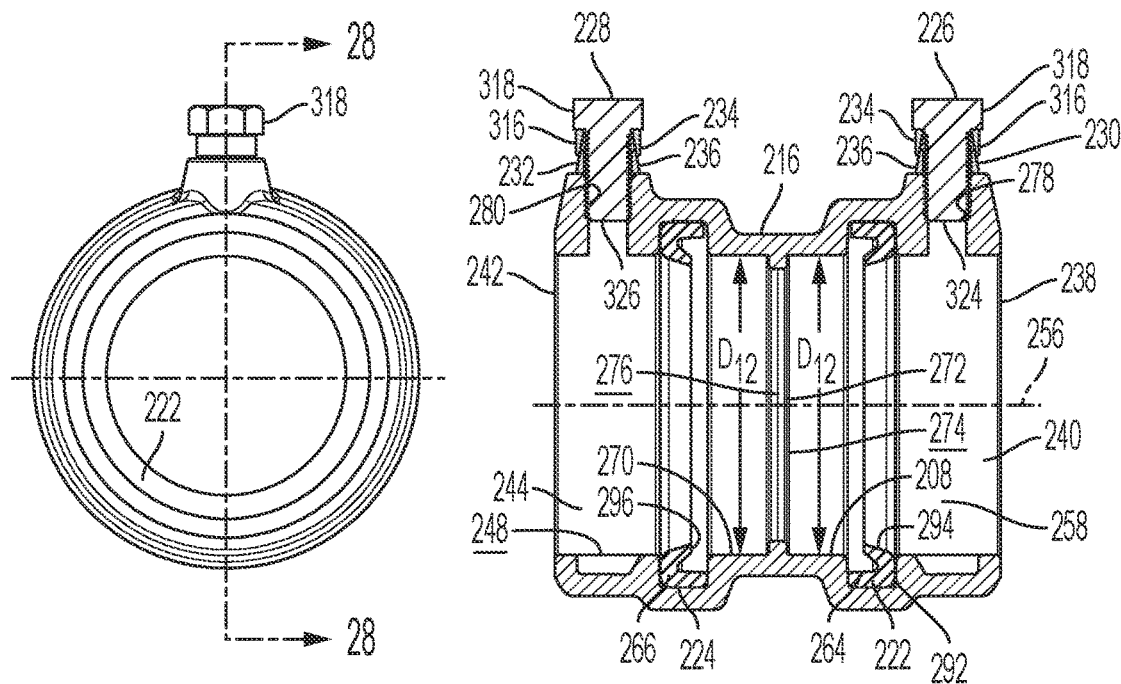
FIG. 27 is a front view of the pipe fitting of FIG. 26.
FIG. 28 is cross-sectional view of the pipe fitting along line 28-28 as shown in FIG. 27.

A second aspect of the fitting assembly 1000 comprising a pipe fitting 210 is disclosed and described in FIGS. 26-31. The pipe fitting 210 can be any suitable type of fitting, including but not limited to, a coupler, adapter, tee, elbow, flange, pipe coupling, pipe clamp, and the like. The pipe fitting 210 of the second aspect is similar to the pipe fitting 10 of the first aspect with the exception that the pipe fitting 210 can be secured to a first pipe section 212 and a second pipe section 214 by an end 324 of the first set screw 226 abutting and clamping down on the outer surface of the first pipe section 212 and by an end 326 of the second set screw 228 abutting and clamping down on the outer surface of the second pipe section 214. The pipe fitting 210 of the second aspect can comprise a housing 216, a first annular seal 222, a second annular seal 224, a first set screw 226, a second set screw 228, and one or more of the positive installation indicators 25. The one or more positive installation indicators 25 can comprise a first positive installation indicator 230 and a second positive installation indicator 232. The first set screw 226 and the first positive installation indicator 230 can define the first indicator assembly 35, and the second set screw 228 and the second positive installation indicator 232 can define the second indicator assembly 45. Each positive installation indicator 230,232 includes an outer indicator ring 234 and an inner indicator ring 236. It should be noted that other fasteners, including but not limited to bolts, screws and rivets, may be used in place of set screws. FIGS. 26-28 illustrate the pipe fitting 210 prior to the pipe sections 212,214 inserted into the pipe fitting 210 and prior to the set screws 226,228 tightened to secure the pipe sections 212, 214 to the pipe fitting 210. In other aspects, the positive installation indicator(s) 25 can be used with any suitable fastener(s), such as bolts, on any other suitable type of fitting, such as a pipe clamp or pipe coupling, wherein it is desired to indicate that the fastener(s) are properly tightened.

The housing 216 can be formed of a high strength metallic material, including but not limited to iron, aluminum or their alloys or of a high strength polymeric material. The housing 216 can be formed by casting, stamping and/or machining. The housing 216 has a first end 238 defining a first entrance 240 and a second end 242 defining a second entrance 244. The housing 216 has a generally annular outer surface 246 and a generally annular inner surface 248. The outer surface 246 of the housing 216 includes a first boss 250, a second boss 252 and an annular groove 254.

The housing 216 defines an axis 256 extending from the first end 238 of the housing to the second end 242 of the housing. The inner surface 248 of the housing defines a cavity 258 radially inwardly of the inner surface 248 and extending from the first entrance 240 to the second entrance 244. The axis 256 extends through the middle center line of the cavity 258. The inner surface 248 defines a first annular seal retaining groove 264 axially inwardly of the first entrance 240 and a second annular seal retaining groove 266 axially inwardly of the second entrance 244. A first pipe retaining portion 268 is located axially inwardly of the first annular seal retaining groove 264 and a second pipe retaining portion 270 is located axially inwardly of the second annular seal retaining groove 266. A diameter $D_{12}$ of the pipe retaining portions 268,270 is slightly larger than a diameter $D_{11}$ of the first and second pipe sections 212,214 to allow the pipe sections 212,214 to be inserted into the pipe retaining portions 268,270 while minimizing radial movement of the pipe sections 212,214 relative to the housing 216. An annular radially inwardly extending pipe abutment 272 is located between the first pipe retaining portion 268 and the second pipe retaining portion 270. The pipe abutment 272 has a first annular surface 274 to prevent the first pipe section 212 from moving further axially inwardly and a second annular surface 276 to prevent the second pipe section 214 from moving further axially inwardly. The first annular seal retaining groove 264, the first pipe retaining portion 268, the pipe abutment 272, the second pipe retaining portion 270 and the second annular seal retaining groove 266 together form the inner surface 248 of the housing 216.

The housing 216 defines a first threaded hole 278 extending through the first boss 250 radially inwardly towards the housing axis 256 from the outer surface 246 to the inner surface 248 of the housing. The first threaded hole 278 can be sized to accommodate the first set screw 226. The housing 216 further defines a second threaded hole 280 extending through the second boss 252 radially inwardly towards the housing axis 256 from the outer surface 246 to the inner surface 248 of the housing. The second threaded hole 280 can be sized to accommodate the second set screw 228 (shown in FIGS. 1-5). The threaded holes 278,280 can be chamfered to allow the set screws 226, 228, to be guided to the holes 278,280. The axis of the first threaded hole 278 is approximately perpendicular to the axis 256 of the housing 216. The axis of the second threaded hole 280 is approximately perpendicular to the axis 256 of the housing 216.

The annular seals 222,224 of the pipe fitting 210 of the second aspect can be the same as the annular seals 22,24 of the first aspect and function in the same manner as the annular seals 22,24 of the first aspect. Each annular seal 222,224 includes a ring body 292 and a lip or sealing portion 294 extending axially inwardly and radially inwardly from one axial end of the ring body 292. Each annular seal 222,224 is positioned in the corresponding annular seal retaining groove 264,266 such that the sealing portion 294 extend axially away from the corresponding entrance 240, 244. The lip or sealing portion 294 has a radially inward annular edge 296. The diameter of the radially inward annular edge 296 of the sealing portion is smaller than the diameter of the first and second pipe sections 212,214, such that as the pipe section 212,214 is inserted through the annular seal 222,224, the outer surface of the pipe section 212,214 stretches the sealing portion 294 radially outwardly.

The outer indicator ring 234 of the second aspect can be the same as the outer indicator ring 34 of the first aspect and functions in the same manner as the outer indicator ring 34. The inner indicator ring 236 of the second aspect can be the same as the inner indicator ring 36 of the first aspect and functions in the same manner as the inner indicator ring 36 of the first aspect. The outer indictor ring 234 and the inner indicator 236 together form a positive installation indicator 230,232. The inner indicator ring 236 can be of a color different than the color of the outer indicator ring 234. For example, the inner indicator ring 236 can be red while the outer indicator ring 234 can be green. The outer indicator ring 234 includes a first end, a second end, an outer surface and an inner surface. The outer indicator ring 234 defines a hollow bore extending from the first end to the second end. The inner surface of the outer indicator ring 234 is conical shaped such that the diameter of the inner surface at first end is smaller than the diameter of the inner surface at the second end. The inner indicator ring 236 can be formed of a material that is harder or less elastic than the material forming the outer indicator ring 234 such that upon the outer indicator ring 234 being slid over the inner indicator ring 236, the outer indicator ring 234 is able to expand radially outwardly to accommodate the inner indicator ring 236 being further inserted into the outer indicator ring 234. The inner indicator ring 236 includes a first end, a second end, an outer surface and an inner surface. The inner indicator ring 236 defines a hollow bore extending from the first end to the second end. The outer surface of the inner indicator ring 236 is conical shaped such that the diameter of the outer surface at the first end is smaller than the diameter of the outer surface at the second end. The angle of the outer surface of the inner indicator ring 236 is approximately the same as the angle of the inner surface of the outer indicator ring 234 to allow the outer indicator ring 234 to be situated radially outwardly of the inner indicator ring 236 upon the outer indicator ring 234 being expanded.

The first and second set screws 226,228 of the second aspect, each includes a head 318 and a threaded shaft 320. The head 318 of each set screw 226,228 has an annular axial inner surface adjacent and transition to the threaded shaft 320. The first set screw 226 is inserted through the hollow bore of the outer indicator ring 234 such that the first end of the outer indicator ring is adjacent to and abuts the axial inner surface of the head 318. The first set screw 226 is then inserted through the hollow bore of the inner indicator ring 236 such that the first end of the inner indicator ring is adjacent to the second end of the outer indicator ring 234. The first set screw 226, with the outer indicator ring 234 and the inner indicator ring 236 positioned radially outwardly of the shaft 320 is attached to the housing 216 by inserting the threaded shaft 320 in the first threaded hole 278 and rotating the first set screw 226 to move the first set screw radially inwardly along the axis of the first thread hole towards the housing axis 256. Likewise, the second set screw 228 is inserted through the hollow bore of the outer indicator ring 234 such that the first end of the outer indicator ring is adjacent to and abuts the axial inner surface of the head 318. The second set screw 228 is then inserted through the hollow bore of the inner indicator ring 236 such that the first end of the inner indicator ring is adjacent to the second end of the outer indicator ring 234. The first set screw 226, with the outer indicator ring 234 and the inner indicator ring 236 positioned radially outwardly of the shaft 320, is attached to the housing 216 by inserting the threaded shaft 320 in the second threaded hole 280 and rotating the second set screw 228 to move the second set screw radially inwardly along the axis of the second thread hole towards the housing axis 256.

Figure 29:
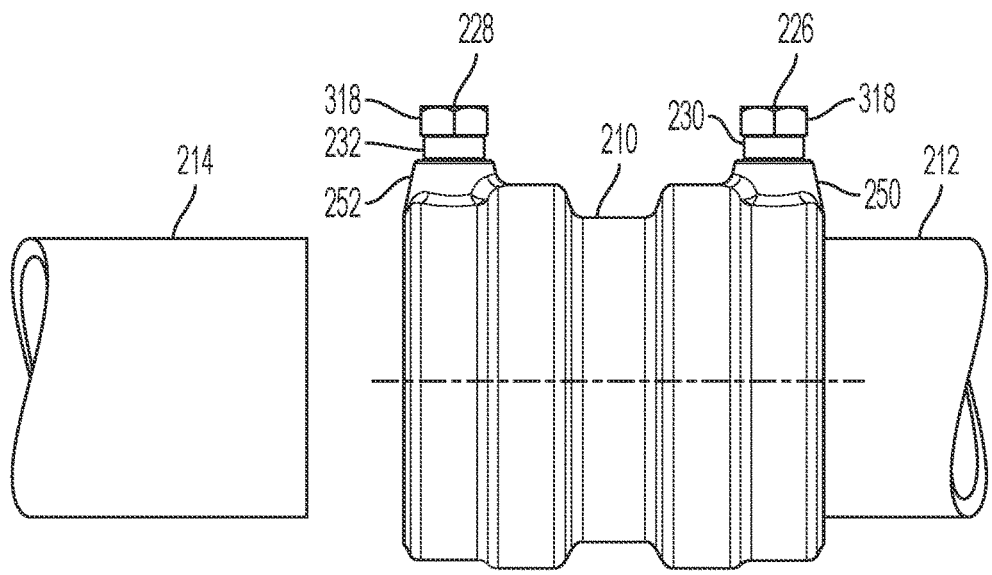
FIG. 29 is a side view of the pipe fitting illustrated in FIG. 26 after one section of pipe has been inserted into the pipe fitting and the set screws tightened.
Figure 30:
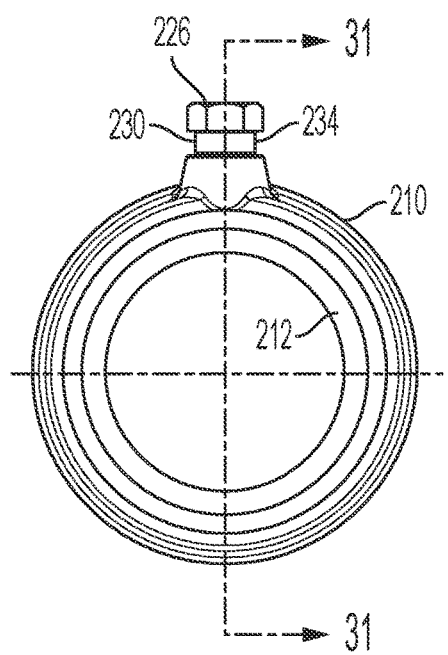
FIG. 30 is a front view of the pipe fitting of FIG. 29.
Figure 31:
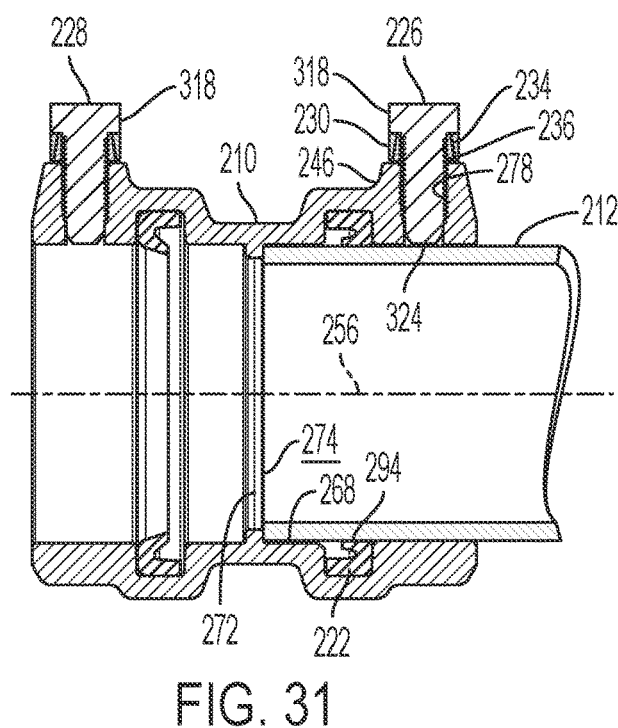
FIG. 31 is cross-sectional view of the pipe fitting along line 31-31 as shown in FIG. 30.

Referring to FIGS. 29-31, after the first annular seal 222 has been installed in the first annular seal retaining groove 264 (shown in FIG. 28), the second annular seal 224 has been installed in the second annular seal retaining groove 266, the first set screw 226, with the first positive installation indicator 230 positioned radially outwardly of the shaft 320, has been installed in the first threaded hole 278, and the second set screw 228, with the second positive installation indicator 232 positioned radially outwardly of the shaft 320, has been installed in the second threaded hole 280, the first pipe section 212 and the second pipe section 214 can be joined to the pipe fitting 210.

FIGS. 29-31 illustrate only the first pipe section 212 inserted into and joined to the pipe fitting 210. The second pipe section 214 is not shown in FIGS. 30-31 to provide clarity and contrast to a pipe section that has been inserted into and joined to the pipe fitting 210. It should be noted that to join the first pipe section 212 and the second pipe section 214 to the pipe fitting 210 to form a fluid connection between the first pipe section 212 with the second pipe section 214, the second pipe section 214 is inserted into and secured to the pipe fitting 210 in the same manner that the first pipe section 212 is inserted into and secured to the pipe fitting 210.

To join the first pipe section 212 to the pipe fitting 210, the first pipe section 212 is inserted axially into the pipe fitting 210 through the first entrance 240 (shown in FIG. 28). As the first pipe section 212 is inserted further into the pipe fitting, the outer surface of the first pipe section 212 contact the sealing portion 294 of the first annular seal 222 and stretch the sealing portion 294 radially outwardly to create a fluid seal between the first pipe section 212 and the first annular seal 222. The first pipe section 212 is inserted into the pipe fitting 210 until the end of the first pipe section 212 abuts first annular surface 274 of the pipe abutment 272 and is situated in the first pipe retaining portion 268. Once the first pipe section 212 has been properly inserted into the pipe fitting 210, the first pipe section 212 can be secured to the pipe fitting 210. To secure the first pipe section 212 to the pipe fitting 210, the first set screw 226 is rotated such that the threading of the first set screw 226 and the threading of the first threaded hole 278 causes the first set screw 226 to move radially inwardly towards the housing axis 256. As the first set screw 226 moves radially inwardly, the outer indicator ring 234 and the inner indicator ring 236 are compressed in between the axially inner surface of the head 318 of the set screw 226 and the outer surface 246 of the housing 216 at the first boss 250. As the outer indicator ring 234 and the inner indicator ring 236 are being compressed, the outer indicator ring 234 expands and slides over the inner indicator ring 236. The first set screw 226 is moved radially inwardly until the end 324 of the first set screw 226 abuts and applies a clamping force to the first pipe section 212; thus, preventing the first pipe section 212 from moving axially relative to the pipe fitting 210. The first positive installation indicator 230 is sized or calibrated such that upon the first set screw 226 being moved to a position where the end 324 of the first set screw 226 abuts and applies the necessary clamping force to the first pipe section, the inner indicator ring 236 is completely radially inwardly of the outer indicator ring 234 such that the inner indicator ring 236 is no longer visible. The inner indicator ring 236 can be of a color different than the color of the outer indicator ring 234. Having the inner indicator ring 236 be a different color than the outer indicator ring 234 allows for easy visual verification that the outer indicator ring 234 has completely surrounded the inner indicator ring 234 and the first set screw 226 has moved sufficiently radially inwardly to apply the necessary clamping force to the first pipe section 212.

While FIGS. 29-31 do not illustrate the second pipe section 214 inserted into and joined to the pipe fitting 210, the process for inserting the second pipe section 214 into the pipe fitting 210 through the second entrance until the end of the second pipe section 214 abuts the second annular surface 276 of the pipe abutment 272 and is situated in the second pipe retaining portion 270 is the same as the process for inserting the first pipe section 212 into the pipe fitting 210 through the first entrance until the end of the first pipe section 212 abuts the first annular surface 274 of the pipe abutment and is situated in the first pipe retaining portion 268. Likewise, while FIGS. 29-31 do not illustrate the second pipe section 214 secured to the pipe fitting 210, the process for securing the second pipe section 214 to the pipe fitting 210 is the same as the process for securing the first pipe section 214 to the pipe fitting 210. The second set screw 228 is rotated such that the threading of the second set screw 228 and the threading of the second threaded hole 280 causes the second set screw 228 to move radially inwardly towards the housing axis 256. As the second set screw 228 moves radially inwardly, the outer indicator ring 234 and the inner indicator ring 236 are compressed in between the axially inner surface of the head 318 of the set screw 228 and the outer surface 246 of the housing 216 at the second boss 252. As the outer indicator ring 234 and the inner indicator ring 236 are being compressed, the outer indicator ring 234 expands and slides over the inner indicator ring 236. The second set screw 228 is moved radially inwardly until the end 326 of the second set screw 228 abuts and applies a clamping force to the second pipe section 214; thus, preventing the second pipe section 214 from moving axially relative to the pipe fitting 210. The second positive installation indicator 232 is sized or calibrated such that upon the second set screw 228 being moved to a position where the end 326 of the second set screw 228 abuts and applies the necessary clamping force to the second pipe section, the inner indicator ring 236 is completely radially inwardly of the outer indicator ring 234 such that the inner indicator ring 236 is no longer visible. The inner indicator ring 236 can be of a color different than the color of the outer indicator ring 234. Having the inner indicator ring 236 be a different color than the outer indicator ring 234 allows for easy visual verification that the outer indicator ring 234 has completely surrounded the inner indicator ring 234 and the second set screw 228 has moved sufficiently radially inwardly to abut and apply the necessary clamping force to the second pipe section 214.

A third aspect of the fitting assembly 1000 comprising a pipe fitting 410 is disclosed and described in FIGS. 32-37. The pipe fitting 410 can be any suitable type of fitting, including but not limited to, a coupler, adapter, tee, elbow, flange, pipe coupling, pipe clamp, and the like. The pipe fitting 410 of the third aspect is similar to the pipe fitting 10 of the first aspect with the exception that the second end of the inner indicator ring is adjacent to and abuts the axial inner surface of the head and the first end of outer indicator ring is adjacent to and abuts the outer surface of the housing at the responding first or second boss. As shown in FIGS. 32-34, the pipe fitting 410 can comprise a housing 416, a first grip ring 418, a second grip ring 420, a first annular seal 422, a second annular seal 424, a first set screw 426, a second set screw 428, and one or more of the positive installation indicators 25. The one or more positive installation indicators 25 can comprise a first positive installation indicator 430 and a second positive installation indicator 432. The first set screw 426 and the first positive installation indicator 430 can define the first indicator assembly 35, and the second set screw 428 and the second positive installation indicator 432 can define the second indicator assembly 45. Each positive installation indicator 430,432 includes an outer indicator ring 434 and an inner indicator ring 436. The first pipe section 412 and the second pipe section 414 to be inserted into the third aspect of the pipe fitting 410 can be the same as the first and second pipe sections 12,14 to be inserted into the first aspect of the pipe fitting 10. The housing 416 of the third aspect can be the same as the housing 16 of the first aspect and functions in the same manner as the housing 16. The first grip ring 418 and the second grip ring 420 of the third aspect can be the same as the first and second grip rings 18,20 of the first aspect and can be installed to the housing 416 and function in the same manner as the first and second grip rings 18,20. The first annular seal 422 and the second annular seal 424 of the third aspect can be the same as the first and second annular seals 22,24 of the first aspect and can be installed to the housing 416 and function in the same manner as the first and second annular seals 22,24. The first set screw 426 and the second set screw 428 of the third aspect can be the same as the first and second set screws 26,28 of the first aspect and function in the same manner as the first and second set screws 26,28. In other aspects, the positive installation indicator(s) 25 can be used with any suitable fastener(s), such as bolts, on any other suitable type of fitting, such as a pipe clamp or pipe coupling, wherein it is desired to indicate that the fastener(s) are properly tightened.

The outer indicator ring 434 of the third aspect can be the same as the outer indicator ring 34 of the first aspect. The inner indicator ring 436 of the third aspect can be the same as the inner indicator ring 36 of the first aspect. The outer indictor ring 434 and the inner indicator 436 together form a positive installation indicator 430,432. The inner indicator ring 436 can be of a color different than the color of the outer indicator ring 434. For example, the inner indicator ring 436 can be red while the outer indicator ring 434 can be green. As shown in FIGS. 33 and 34, the outer indicator ring 434 includes a first end 498, a second end 500, an outer surface 502 and an inner surface 504. The outer indicator ring 434 defines a hollow bore 506 extending from the first end 498 to the second end 500. The inner surface of the outer indicator ring 434 is conical shaped. The inner indicator ring 436 can be formed of a material that is harder or less elastic than the material forming the outer indicator ring 434 such that upon the outer indicator ring 434 being slid over the inner indicator ring 436, the outer indicator ring 434 is able to expand radially outwardly to accommodate the inner indicator ring 436 being further inserted into the outer indicator ring 434. The inner indicator ring 436 includes a first end 508, a second end 510, an outer surface 512 and an inner surface 514. The inner indicator ring 436 defines a hollow bore 516 extending from the first end 508 to the second end 510. The outer surface 512 of the inner indicator ring 436 is conical shaped. The angle of the outer surface 512 of the inner indicator ring 436 is approximately the same as the angle of the inner surface 504 of the outer indicator ring 434 to allow the outer indicator ring 434 to be situated radially outwardly of the inner indicator ring 436 upon the outer indicator ring 434 being expanded.

The first and second set screws 426,428 of the third aspect, each includes a head 518 and a threaded shaft 520 (shown in FIG. 34). The head 518 of each set screw 426,428 has an annular axial inner surface 522 adjacent and transition to the threaded shaft 520. The first set screw 426 is inserted through the hollow bore 516 of the inner indicator ring 436 such that the second end 500 of the inner indicator ring 436 is adjacent to and abuts the axial inner surface 522 of the head 518 (shown in FIG. 33). The first set screw 226 is then inserted through the hollow bore 506 of the outer indicator ring 434 such that the second end 500 of the outer indicator ring 434 is adjacent to the first end 508 of the inner indicator ring 436 (shown in FIG. 33). The first set screw 426, with the inner indicator ring 436 and the outer indicator ring 434 positioned radially outwardly of the shaft 520, is attached to the housing 416 by inserting the threaded shaft 520 in the first threaded hole 478 and rotating the first set screw 426 to move the first set screw radially inwardly along the axis of the first thread hole towards the housing axis 456. Likewise, the second set screw 428 is inserted through the hollow bore 516 of the inner indicator ring 436 such that the second end 510 of the inner indicator ring 436 is adjacent to and abuts the axial inner surface 522 of the head 518. The second set screw 428 is then inserted through the hollow bore 506 of the outer indicator ring 434 such that the second end 500 of the outer indicator ring 434 is adjacent to the first end 508 of the inner indicator ring 436. The second set screw 428, with the inner indicator ring 436 and the outer indicator ring 434 positioned radially outwardly of the shaft 520, is attached to the housing 416 by inserting the threaded shaft 520 in the second threaded hole 480 and rotating the second set screw 428 to move the second set screw radially inwardly along the axis of the second thread hole towards the housing axis 456.

Referring to FIGS. 35-37, after the first grip ring 418, the second grip ring 420, first annular seal 422, and second annular seal 424 have been installed in housing 416, the first set screw 426, with the first positive installation indicator 430 positioned radially outwardly of the shaft 520, has been installed in the first threaded hole 478, and the second set screw 428, with the second positive installation indicator 432 positioned radially outwardly of the shaft 520, has been installed in the second threaded hole 480, the first pipe section 412 and the second pipe section 414 can be inserted into and joined to the pipe fitting 410.

FIGS. 35-37 illustrate only the first pipe section 412 inserted into and joined to the pipe fitting 410. The second pipe section 414 is not shown in FIG. 37 to provide clarity and contrast to a pipe section that has been inserted into and joined to the pipe fitting 410. It should be noted that to join the first pipe section 412 and the second pipe section 414 to the pipe fitting 410 to form a fluid connection between the first pipe section 412 with the second pipe section 414, the second pipe section 414 is inserted into and secured to the pipe fitting 410 in the same manner that the first pipe section 412 is inserted into and secured to the pipe fitting 410.

The first pipe section 412 of the third aspect can be inserted into the pipe fitting 410 in the same manner as the first pipe section 12 of the first aspect is inserted into the pipe 10. The interaction of the first pipe section 412 with the first grip ring 418 and the first annular seal 422 of the third aspect can be the same as the interaction of the pipe section 12 with the first grip 18 and the first annular seal 22 of the first aspect. Once the first pipe section 412 has been properly inserted into the pipe fitting 410, the first pipe section 412 can be secured to the pipe fitting 410. To secure the first pipe section 412 to the pipe fitting 410, the first set screw 426 is rotated such that the threading of the first set screw 426 and the threading of the first threaded hole 478 causes the first set screw 426 to move radially inwardly towards the housing axis 456. As the first set screw 426 moves radially inwardly, the inner indicator ring 436 and the outer indicator ring 434 are compressed in between the axially inner surface 522 of the head 518 of the set screw 426 and the outer surface 446 of the housing 416 at the first boss 450. As the inner indicator ring 436 and the outer indicator ring 434 are being compressed, the outer indicator ring 434 expands and slides over the inner indicator ring 436. The first set screw 426 is moved radially inwardly until an end 524 of the first set screw 426 pushes against the ring body 486 of the first grip ring 418 to apply a clamping force to the first pipe section 412; thus, preventing the first pipe section 412 from moving axially relative to the pipe fitting 410. The first positive installation indicator 430 is sized or calibrated such that upon the first set screw 426 being moved to a position where the end 524 of the first set screw 426 pushes the ring body 486 to apply the necessary clamping force to the first pipe section, the inner indicator ring 436 is completely radially inwardly of the outer indicator ring 434 such that the inner indicator ring 436 is no longer visible. The inner indicator ring 436 can be of a color different than the color of the outer indicator ring 434. Having the inner indicator ring 436 be a different color than the outer indicator ring 434 allows for easy visual verification that the outer indicator ring 434 has completely surrounded the inner indicator ring 434 and the first set screw 426 has moved sufficiently radially inwardly to apply the necessary clamping force to the first pipe section 412. While FIGS. 35-37 do not illustrate the second pipe section 414 secured to the pipe fitting 410, the process for securing the second pipe section 414 to the pipe fitting 410 is the same as the process for securing the first pipe section 414 to the pipe fitting 410.

Figure 41:
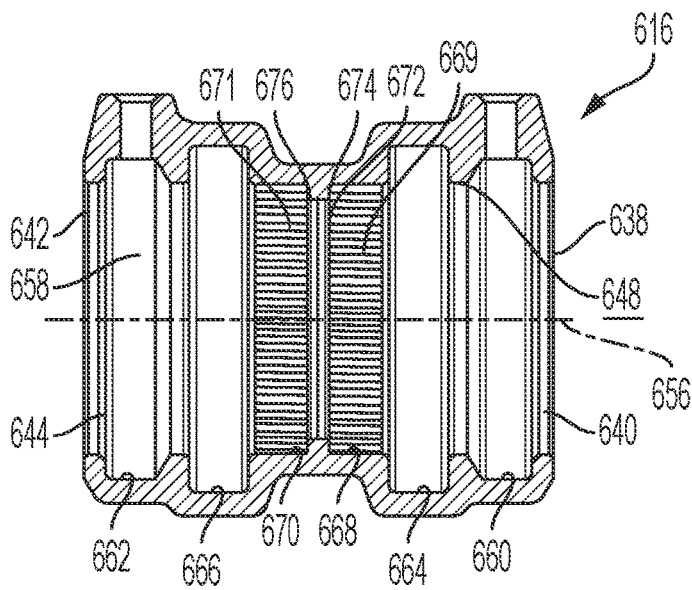
FIG. 41 is a cross-sectional view of the housing along line 41-41 as shown in FIG. 39.
Figure 42:
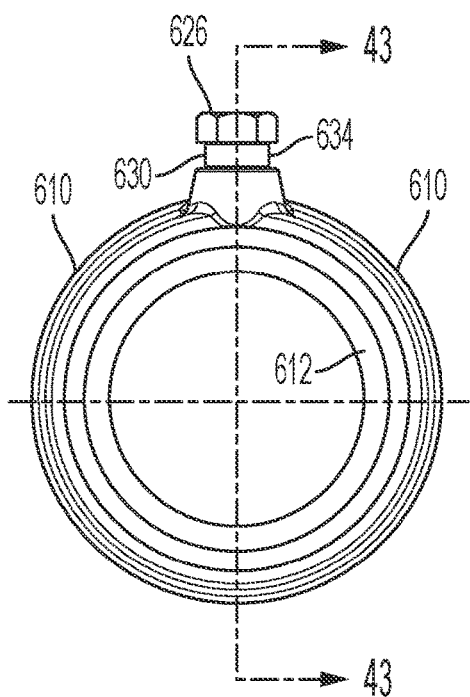
FIG. 42 is a front view of the pipe fitting of FIG. 38.
Figure 43:
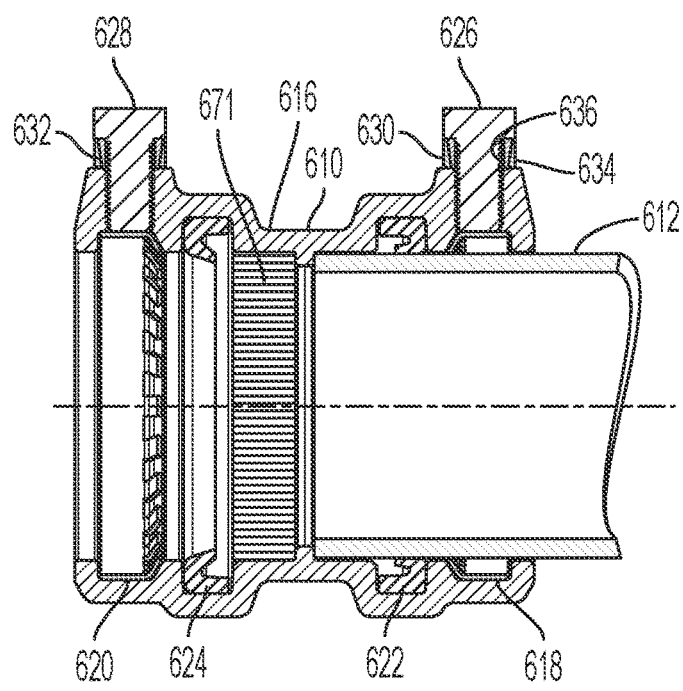
FIG. 43 is a cross-sectional view of the pipe fitting along line 43-43 as shown in FIG. 42.

A fourth aspect of the fitting assembly 1000 comprising a pipe fitting 610 is disclosed and described in FIGS. 38-43. The pipe fitting 610 can be any suitable type of fitting, including but not limited to, a coupler, adapter, tee, elbow, flange, pipe coupling, pipe clamp, and the like. The pipe fitting 610 of the fourth aspect is similar to the pipe fitting 10 of the first aspect with the exception that the first pipe retaining portion and the second pipe retaining portion include a plurality of teeth extending radially inwardly to better stabilize the inserted first and second pipe sections and to better secure the first and second pipe sections to the pipe fitting. As shown in FIG. 43, the pipe fitting 610 can comprise a housing 616, a first grip ring 618, a second grip ring 620, a first annular seal 622, a second annular seal 624, a first set screw 626, a second set screw 628, and one or more of the positive installation indicators 25. The one or more positive installation indicators 25 can comprise a first positive installation indicator 630 and a second positive installation indicator 632. The first set screw 626 and the first positive installation indicator 630 can define the first indicator assembly 35, and the second set screw 628 and the second positive installation indicator 632 can define the second indicator assembly 45. The first pipe section 612 and the second pipe section 614 (shown in FIG. 38) to be inserted into the fourth aspect of the pipe fitting 610 can be the same as the first and second pipe sections 12,14 to be inserted into the first aspect of the pipe fitting 10. The first grip ring 618 and the second grip ring 620 of the fourth aspect can be the same as the first and second grip rings 18,20 of the first aspect and can be installed to the housing 616 and function in the same manner as the first and second grip rings 18,20. The first annular seal 622 and the second annular seal 624 of the fourth aspect can be the same as the first and second annular seals 22,24 of the first aspect and can be installed to the housing 616 and function in the same manner as the first and second annular seals 22,24. The first set screw 626 and the second set screw 628 of the fourth aspect can be the same as the first and second set screws 26,28 of the first aspect and function in the same manner as the first and second set screws 26,28. The first positive installation indicator 630 and the second positive installation indicator 632 of the fourth aspect can be the same as the first and second positive installation indicators 30,32 of the first aspect, can be attached to the first and second set screws 626, 628 in the same manner as the first and second positive installation indicators 30,32, and can function in the same manner as the first and second positive installation indicators 30,32 to allow for visual verification that the outer indicator ring 634 has completely surrounded the inner indicator ring 636 and the corresponding the set screw 626,628 has moved sufficiently radially inwardly to apply the necessary clamping force to the corresponding pipe section 612,614. In other aspects, the positive installation indicator(s) 25 can be used with any suitable fastener(s), such as bolts, on any other suitable type of fitting, such as a pipe clamp or pipe coupling, wherein it is desired to indicate that the fastener(s) are properly tightened.

Figure 38:
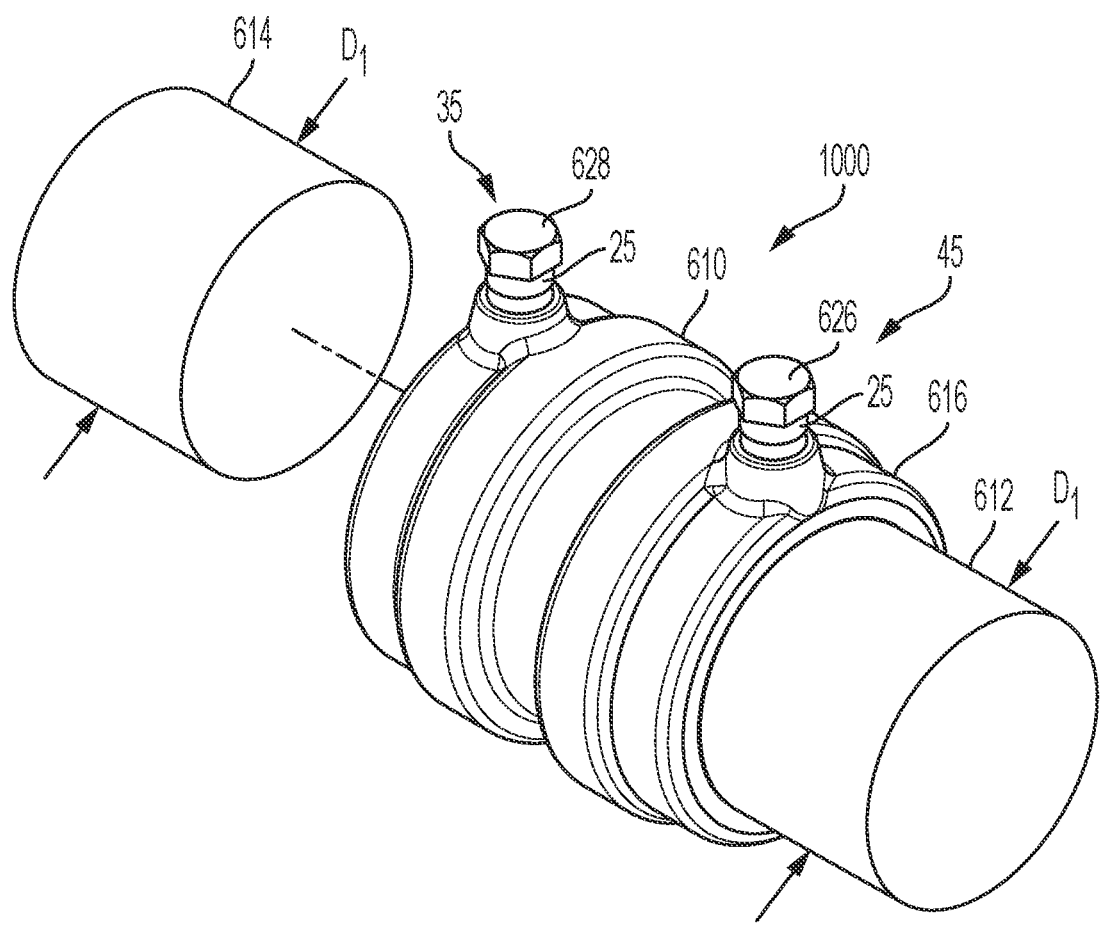
FIG. 38 is a perspective view of a pipe fitting according to a fourth aspect of the present disclosure after one section of pipe has been inserted into the pipe fitting and the set screws tightened.
Figure 39:
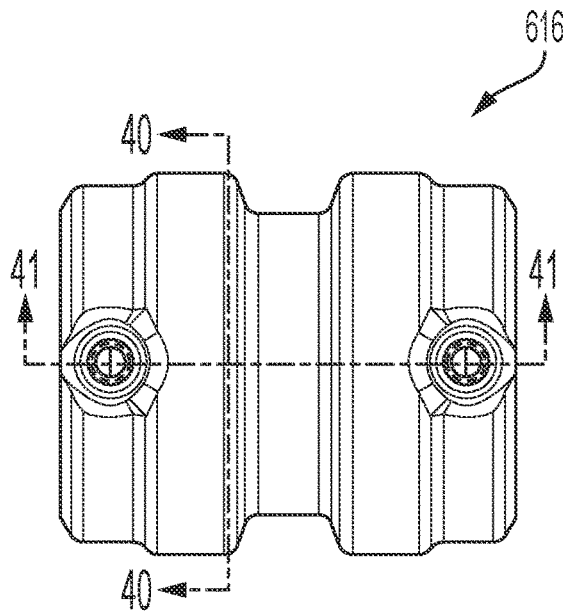
FIG. 39 is a top view of the housing of FIG. 38.
Figure 40:
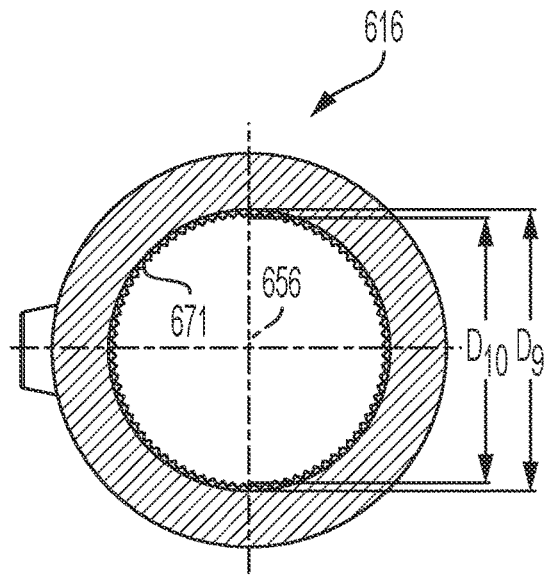
FIG. 40 is a cross-sectional view of the housing along line 40-40 as shown in FIG. 39.

As shown in FIGS. 39-41, the housing 616 of the fourth aspect defines an axis 656 extending from the first end 638 of the housing to the second end 642 of the housing. The inner surface 648 of the housing defines a cavity 658 radially inwardly of the inner surface 648 and extending from the first entrance 640 to the second entrance 644. The axis 656 extends through the middle center line of the cavity 658. The inner surface 648 defines a first grip ring retaining groove 660 axially inwardly of the first entrance 640 and a second grip ring retaining groove 662 axially inwardly of the second entrance 644. Axially inwardly of the first grip ring retaining groove 660 is a first annular seal retaining groove 664 and axially inwardly of the second grip ring retaining groove 662 is a second annular seal retaining groove 666. A first pipe retaining portion 668 is located axially inwardly of the first annular seal retaining groove 664 and a second pipe retaining portion 670 is located axially inwardly of the second annular seal retaining groove 666. The first pipe retaining portion 668 includes a plurality of teeth 669 extending radially inwardly toward the axis 656. The second pipe retaining portion 670 includes a plurality of teeth 671 extending radially inwardly toward the axis 656. The radially outermost extent of the teeth (or the valley of the teeth) defines a diameter $D_9$. The radially innermost extent of the teeth (or the point of the teeth) defines a diameter $D_{10}$. The diameter $D_1$ of the first and second pipe section 612,614 (shown in FIG. 38) is slightly smaller than the diameter $D_9$ of the outermost extent of the teeth 669,671 and slightly larger than the diameter $D_{10}$ of the innermost extend of the teeth 669,671 to allow the points of the teeth to scrap or dig into the outer surface of corresponding first or second pipe section 612,614. An annular radially inwardly extending pipe abutment 672 is located between the first pipe retaining portion 668 and the second pipe retaining portion 670. The pipe abutment 672 has a first annular surface 674 to prevent the first pipe section 612 from moving further axially inwardly and a second annular surface 676 to prevent the second pipe section 614 from moving further axially inwardly. The first grip ring retaining groove 660, the first annular seal retaining groove 664, the first pipe retaining portion 668, the pipe abutment 672, the second pipe retaining portion 670, the second annular seal retaining groove 666 and the second grip retaining groove 662 together form the inner surface 648 of the housing 616.

FIGS. 38 and 42-43 illustrate only the first pipe section 612 inserted into and joined to the pipe fitting 610. The second pipe section 614 is not shown in FIGS. 42-43 to provide clarity and contrast to a pipe section that has been inserted into and joined to the pipe fitting 610. It should be noted that to join the first pipe section 612 and the second pipe section 614 to the pipe fitting 610 to form a fluid connection between the first pipe section 612 with the second pipe section 614, the second pipe section 614 is inserted into and secured to the pipe fitting 610 in the same manner that the first pipe section 612 is inserted into and secured to the pipe fitting 610.

To join the first pipe section 612 to the pipe fitting 610, the first pipe section 612 can be inserted axially into the pipe fitting 610 through the first grip ring 618 and the first annular seal 622 in the same manner as the first pipe section 12 is inserted axially into the pipe fitting 10 of the first aspect through the first grip ring 18 and the first annular seal 22. The first pipe section 612 is then inserted into the pipe fitting 610 until outer surface of the pipe section 612 contacts the innermost extent of the teeth 669 of the first pipe retaining portion 668. As the pipe section 612 is further inserted into the pipe section 610, the innermost extent of the teeth 669 of the first pipe retaining portion 668 scrap or dig into the outer surface of the first pipe section 612 until the end of the first pipe section 614 abuts the first annular surface 674 of the pipe abutment 672. Due to the teeth 669 scrapping or digging into the first pipe section 612, the first pipe section 612 is better stabilized in the pipe fitting 610 and additional resistance is provided for the first pipe section 612 being pulled out of the pipe fitting 610. Once the first pipe section 612 has been properly inserted into the pipe fitting 610, the first set screw 626 can rotated to cause the first set screw 626 to move radially inwardly towards the housing axis 656 and compress the outer indicator ring 634 and the inner indicator ring 636 until the outer indicator ring 634 slides over the inner indicator ring 636 in the same manner as the outer indicator ring 34 of the first embodiment slides over the inner indicator ring 36 to confirm that the first set screw 626 has moved sufficiently radially inwardly to apply the necessary clamping force to the pipe section 612.

Figure 44:
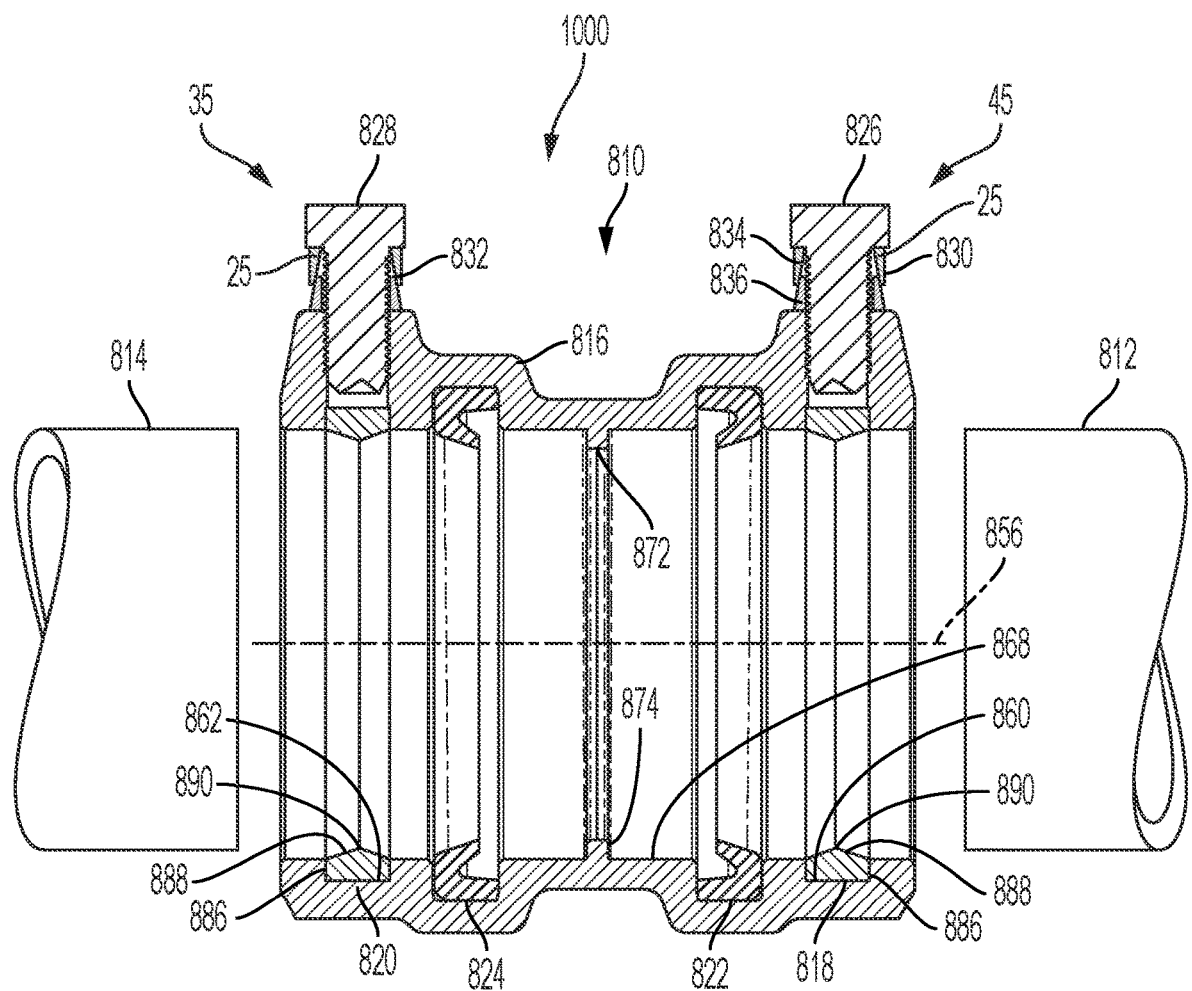
FIG. 44 is a cross-sectional view of a pipe fitting according to a fifth aspect of the present disclosure prior to sections of pipes inserted into the pipe fitting and the set screws tightened.

A fifth aspect of the fitting assembly 1000 comprising a pipe fitting 810 is disclosed and described in FIG. 44. The pipe fitting 810 can be any suitable type of fitting, including but not limited to, a coupler, adapter, tee, elbow, flange, pipe coupling, pipe clamp, and the like. The pipe fitting 810 of the fifth aspect is similar to the pipe fitting 10 of the first aspect with the exception that edged rings are used in place of the grip rings of the first aspect. As shown in FIG. 44, the pipe fitting 810 can comprise a housing 816, a first edged ring 818, a second edged ring 820, a first annular seal 822, a second annular seal 824, a first set screw 826, a second set screw 828, and one or more of the positive installation indicators 25. The one or more positive installation indicators 25 can comprise a first positive installation indicator 830 and a second positive installation indicator 832. The first set screw 826 and the first positive installation indicator 830 can define the first indicator assembly 35, and the second set screw 828 and the second positive installation indicator 832 can define the second indicator assembly 45. The first pipe section 812 and the second pipe section 814 to be inserted into the fifth aspect of the pipe fitting 810 can be the same as the first and second pipe sections 12,14 to be inserted into the first aspect of the pipe fitting 10. The housing 816 of the fifth aspect can be similar to the housing 16 of the first aspect and functions in the same manner as the housing 16 with the exception of the ring retaining grooves 860,862 sized and shaped to accommodate the edged rings 818,820. The first annular seal 822 and the second annular seal 824 of the fifth aspect can be the same as the first and second annular seals 22,24 of the first aspect and can be installed to the housing 816 and function in the same manner as the first and second annular seals 22,24. The first set screw 826 and the second set screw 828 of the fifth aspect can be the same as the first and second set screws 26,28 of the first aspect and function in the same manner as the first and second set screws 26,28. The first positive installation indicator 830 and the second positive installation indicator 832 of the fifth aspect can be the same as the first and second positive installation indicators 30,32 of the first aspect, can be attached to the first and second set screws 826, 828 in the same manner as the first and second positive installation indicators 30,32, and can function in the same manner as the first and second positive installation indicators 30,32 to allow for visual verification that the outer indicator ring 834 has completely surrounded the inner indicator ring 836 and the corresponding the set screw 826,828 has moved sufficiently radially inwardly to apply the necessary clamping force to the corresponding pipe section 812,814. In other aspects, the positive installation indicator(s) 25 can be used with any suitable fastener(s), such as bolts, on any other suitable type of fitting, such as a pipe clamp or pipe coupling, wherein it is desired to indicate that the fastener(s) are properly tightened.

As shown in FIG. 44, the first edged ring 818 and the second edged ring 820 of the fifth aspect each include a body portion 886 and a v-shaped sharp portion 888 terminating at sharp edge 890 directed towards the axis of the housing 856. The edged rings 818, 820 are circumferentially continuous such that the sharp edge 890 surrounds the corresponding pipe section 812,814 upon the pipe section inserted into the pipe fitting.

To join the first pipe section 812 to the pipe fitting 810, the first pipe section 812 can be inserted axially into the pipe fitting 810 through the first edged ring 818 and the first annular seal 822 and into the first pipe retaining portion 868 until the end of the first pipe 812 abuts the first annular surface 874 of the pipe abutment 872 in the same manner as the first pipe section 12 is inserted axially into the pipe fitting 10 of the first aspect through the first grip ring 18 and the first annular seal 22 and into the first pipe retaining portion 68 until the end of the first pipe 12 abuts the first annular surface 74 of the pipe abutment 72 Once the first pipe section 812 has been properly inserted into the pipe fitting 810, the first set screw 826 can rotated to cause the first set screw 826 to move radially inwardly towards the housing axis 856 and compress the outer indicator ring 834 and the inner indicator ring 836 until the outer indicator ring 834 slides over the inner indicator ring 836 in the same manner as the outer indicator ring 34 of the first embodiment slides over the inner indicator ring 36 to confirm that the first set screw 826 has moved sufficiently radially inwardly to apply the necessary clamping force to the pipe section 812. As the first set screw 826 moves radially inwardly to apply the necessary clamping force to the pipe section 812, the end 124 of the first set screw pushes against the body 886 of the edged ring causing the sharp edge 890 of the first edged ring 818 to compress and dig into the first pipe section 812. Since the first edge ring 818 circumferentially surrounds the first pipe section 812, the contact point between the edge ring 818 and first pipe section 812 can be more balance as compared to the first set screw 826 directly engaging the first pipe section 812. The second pipe section 814 can be joined and secured to the pipe fitting 810 in the same manner as the first pipe section 812 is joined and secured to the pipe fitting 810.

One should note that the different aspects disclosed herein can be combined such that the pipe fitting can include the features of more than one aspect. One should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

It should be emphasized that the above-described aspects are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality That which is claimed is:

1. A pipe coupling comprising:
   a coupling body defining a hole; and
   an indicator assembly comprising:
      a fastener extending through the hole defining a first end, a second end opposite the first end, and an axis extending from the first end to the second end;
      a first indicator positioned radially outwardly of the fastener relative to the axis of the fastener; and
      a second indicator positioned radially outwardly of the fastener relative to the axis of the fastener, wherein the second indicator is axially in between the first indicator and the second end of the fastener upon the fastener being oriented in a first position, and wherein the second indicator is radially inwardly or radially outwardly of the first indicator upon the fastener being oriented in a second position;
   wherein:
      the coupling body defines a cavity configured to receive a pipe section;
      the cavity defines a cavity axis and the hole defines a hole axis; and
      the hole axis of the hole is perpendicular to the cavity axis of the cavity.

2. The pipe coupling of claim 1, wherein each of the first indicator and the second indicator are formed as rings and are concentric to the axis of the fastener.

3. The pipe coupling of claim 1, wherein the fastener defines a head and a shaft, the head having an axial inner surface, and wherein the first indicator is adjacent to the axial inner surface of the fastener.

4. The pipe coupling of claim 1, wherein a height of the first indicator is different than a height of the second indicator.

5. The pipe coupling of claim 1, wherein a color of the first indicator is different than a color the second indicator.

6. The pipe coupling of claim 1, wherein a hardness of the first indicator is different than a hardness of the second indicator.

7. The pipe coupling of claim 1, wherein an elasticity of the first indicator is different than an elasticity of the second indicator.

8. A pipe coupling comprising:
   a coupling body defining a hole; and
   an indicator assembly comprising a fastener extending through the hole, a first indicator mounted on the fastener, and a second indicator mounted on the fastener, the fastener defining an axis;
   wherein:
      the second indicator is axially in between the first indicator and the coupling body upon the fastener being oriented in a first position;
      the second indicator is radially inwardly or radially outwardly of the first indicator upon the fastener being oriented in a second position;
      the coupling body defines a cavity configured to receive a pipe section;
      the cavity defines a cavity axis and the hole defines a hole axis; and
      the hole axis of the hole is perpendicular to the cavity axis of the cavity.

9. The pipe coupling of claim 8, wherein each of the first indicator and the second indicator are formed as rings and are concentric to the hole axis.

10. The pipe coupling of claim 8, wherein the fastener defines a head and a shaft, the shaft extends through the hole in the coupling body, each of the first indicator and the second indicator are mounted on the shaft.

11. The pipe coupling of claim 8, wherein a height of the first indicator is different than a height of the second indicator.

12. The pipe coupling of claim 8, wherein a color of the first indicator is different than a color the second indicator.

13. The pipe coupling of claim 8, wherein a hardness of the first indicator is different than a hardness of the second indicator.

14. The pipe coupling of claim 8, wherein an elasticity of the first indicator is different than an elasticity of the second indicator.

15. A pipe coupling comprising:
   a coupling body defining a hole; and
   an indicator assembly comprising:
      a fastener extending through the hole;
      a first indicator ring mounted on the fastener and defining a first end, a second end opposite the first end, an outer surface, and an inner surface opposite the outer surface, the inner surface defining a conical, hollow bore extending from the first end to the second end, wherein a diameter of the conical, hollow bore at the first end is less than a diameter of the conical, hollow bore at the second end; and
      a second indicator ring mounted on the fastener and configured to engage the conical, hollow bore of the first indicator ring, the second indicator ring defining a first end, a second end opposite the first end, an outer surface, and an inner surface opposite the outer surface, the outer surface defining a conical shape, wherein a diameter of the outer surface at the first end is less than a diameter of the outer surface at the second end;
   wherein:
      the coupling body defines a cavity configured to receive a pipe section;
      the cavity defines a cavity axis and the hole defines a hole axis; and
      the hole axis of the hole is perpendicular to the cavity axis of the cavity.

16. The pipe coupling of claim 15, wherein an angle of the outer surface of the second indicator ring is substantially the same as an angle of the inner surface of the first indicator ring.

17. The pipe coupling of claim 16, wherein the first indicator comprises an elastic material configured to expand to receive the second indicator ring within the conical hollow, bore.

18. The pipe coupling of claim 17, wherein an elasticity of the first indicator is different than an elasticity of the second indicator.

19. The pipe coupling of claim 15, wherein an upper surface of the first indicator at the first end is substantially planar, and wherein a lower surface of the second indicator at the second end is substantially planar.

* * * * *